US012800413B2

(12) United States Patent
Taniuchi

(10) Patent No.: US 12,800,413 B2
(45) Date of Patent: Nov. 17, 2026

(54) APPARATUS FOR FORCE SENSING AND ELECTRONIC DEVICE COMPRISING THE SAME

(71) Applicant: Goertek Inc., Shandong (CN)

(72) Inventor: Hirotada Taniuchi, Shandong (CN)

(73) Assignee: Goertek Inc., Weifang (CN)

( * ) Notice: Subject to any disclaimer, the term of this patent is extended or adjusted under 35 U.S.C. 154(b) by 317 days.

(21) Appl. No.: 18/427,105

(22) Filed: Jan. 30, 2024

(65) Prior Publication Data

US 2024/0219247 A1 Jul. 4, 2024

Related U.S. Application Data

(63) Continuation of application No. PCT/CN2021/111996, filed on Aug. 11, 2021.

(51) Int. Cl.
*G01L 1/22* (2006.01)

(52) U.S. Cl.
CPC .......... *G01L 1/2262* (2013.01); *G01L 1/2281* (2013.01)

(58) Field of Classification Search
CPC ............................ G01L 1/2262; G01L 1/2281
See application file for complete search history.

(56) References Cited

U.S. PATENT DOCUMENTS

2017/0285864 A1 10/2017 Pedder et al.
2023/0288992 A1* 9/2023 Taniuchi ............... G01L 1/2281
2024/0094074 A1* 3/2024 Taniuchi ............... G01L 1/2281

FOREIGN PATENT DOCUMENTS

CN 1334919 A 2/2002
CN 105224129 B 6/2018
CN 110617914 B 1/2022

* cited by examiner

*Primary Examiner* — Eric S. McCall
(74) *Attorney, Agent, or Firm* — Baker Botts LLP

(57) ABSTRACT

An apparatus for force sensing, and an electronic device. In the apparatus, a sensor generating a first signal includes a first hardware element attached to a deformable portion. The first signal depends on a first property of the first hardware element and a second property of a second hardware element. The first property has a dependency on deformation of the deformable portion, and a dependency $m_1$ on temperature at the deformable portion in absence of the second hardware element. The second property has a dependency on the temperature at the deformable portion. When the temperature changes within a target range, the first change and the second change are induced into the first signal through the dependencies of the first property and the second property on the temperature, respectively, and the second change compensates for the first change. Such compensation renders the first signal robust to variations in the temperature.

19 Claims, 10 Drawing Sheets

APPARATUS FOR FORCE SENSING AND ELECTRONIC DEVICE COMPRISING THE SAME

CROSS-REFERENCES TO RELATED APPLICATIONS

This application is a Continuation of International Application No. PCT/CN2021/111996 filed on Aug. 11, 2021, which is hereby incorporated by reference in its entirety.

TECHNICAL FIELD

The present disclosure is related to the technical field of human-computer interaction, and in particular, to an apparatus for force sensing and an electronic device.

BACKGROUND

Recent decades have witnessed fast development of various electronic devices in people's daily life. In order to facilitate utilization, lots of input apparatuses are developed to help users interact with the electronic devices. Force-sensitive or strain-sensitive input apparatuses are becoming more and more popular, since they provide quite convenient force-sensing approaches for the interaction between the users and various types of electronic devices. For example, users can input instructions to a mobile phone or a computer by simply touching, pressing, tapping, gripping, or stretching an operation interface with a finger or a stylus.

The operation interface provided with the force-sensitive or strain-sensitive input apparatus are generally located at a deformable portion of the electronic device, for example, a virtual keyboard or a virtual button on a flexible display, a resilient part of a plastic shell, a thinned part of a metal housing, etc. The force-sensitive or strain-sensitive input apparatus detects deformation of the operation interface, i.e. detects a force or a strain induced by the operation, and thereby enables the electronic device to recognize such operation. FIG. 1 is a schematic structural diagram of a force-sensitive or strain-sensitive input apparatus of an electronic device in conventional technology. As shown in FIG. 1, the force-sensitive or strain-sensitive input apparatus includes a force sensor 3 located at the operation interface 2 of the electronic device 1, and an analog-to-digital comparator (ADC) 4. The force sensor 3 is configured to generate an electrical signal and transmit the electrical signal to the ADC 4. The ADC 4 is configured to compare such signal with a threshold defined by a preset threshold signal, and output a signal of which a state indicates a result of the comparison. The threshold indicates a degree of deformation which is to be recognized by the electronic device. Then, the result is transmitted to a controller (or a processor) 5, and the controller (or the processor) determines whether the operation region deforms, based on the state of the signal.

Generally, the force sensor reflects the force or the strain at the operation region by using an electrical characteristic of the force sensor, and the electrical characteristic is sensitive to temperature. For example, the electrical characteristic may be related to resistance, which strongly depends on temperature according to a temperature coefficient of resistance of a material of the force sensor. Similarly, the electrical characteristic related to inductance also depends on the temperature.

Fast development of the electronic devices further results in increasingly complicated temperature environment within the electronic devices. In one aspect, the miniaturization of the electronic devices brings a great challenge on heat dissipation, and the temperature within an enclosure would change drastically when the electronic device is switched among different operation modes, such as a turbo-mode, an eco-mode, and a sleeping mode. In another aspect, ambient temperature of the electronic devices is rather unstable given various application scenarios. For example, a wearable electronic device exchanges heat with a skin of human body, and thereby the temperature of a housing when a user does some sports is higher than that when the user takes a rest. For another example, an outdoor electronic device would be heated in sunny weather and cooled in cloudy or rainy weather. Since the electrical characteristic, such as the resistance and the inductance, of the force sensor depends on the temperature, an output signal of the force sensor would drift from a theoretical value when the temperature is unstable. Even when there is no deformation at the operation interface, the result of the comparison at the ADC would indicate that the operation interface has deformed each time the drifting output signal reaches the threshold defined by the threshold signal. Consequently, the controller or the processor gives instructions based on erroneous detection, and the electronic device cannot work properly.

SUMMARY

In order to address the above technical issue, following technical solutions are provided according to embodiments of the present disclosure.

In a first aspect, an apparatus for force sensing is provided according to embodiments of the present disclosure. The apparatus is located in or at a surface of an electronic device including a deformable portion, and includes a sensor configured to generate a first signal. The sensor includes a first hardware element attached to the deformable portion, and the first signal depends on a first property of the first hardware element. The apparatus further includes a second hardware element, and the first signal depends on a second property of the second hardware element. The first property has a dependency on deformation of the deformable portion, the second property has a dependency on temperature at the deformable portion, and the first property has another dependency on the temperature at the deformable portion in absence of the second hardware element. When the temperature at the deformable portion changes within a target range, a first change is induced into the first signal through the dependency of the first property on the temperature, and a second change is induced into the first signal through the dependency of the second property on the temperature. The second change compensates for the first change.

In one embodiment, magnitude of a sum of the first change and the second change is smaller than magnitude of the first change.

In one embodiment, the first property is independent from the second property.

In one embodiment, the first property and the second property are resistance of the first hardware element and the second hardware element, respectively, and the first hardware element and the second hardware element are connected in series. Alternatively, the first property and the second property are capacitance of the first hardware element and the second hardware element, respectively, and the first hardware element and the second hardware element are connected parallel.

In one embodiment, within the target range, one of a gradient of the first property with respect to the temperature and a gradient of the second property with respect to the temperature is positive, and another of the gradient of the first property with respect to the temperature and the gradient of the second property with respect to the temperature is negative. Further, within the target range, magnitude of the gradient of the second property with respect to the temperature is smaller than two times magnitude of the gradient of the first property with respect to the temperature.

In one embodiment, within the target range, a product of the first property and temperature coefficient of the first property is equal to a negative of a product of the second property and temperature coefficient of the second property.

In one embodiment, the sensor includes a Wheatstone-bridge circuit, a first arm of the Wheatstone-bridge circuit includes the first hardware element, and a second arm of the Wheatstone-bridge circuit includes the second hardware element.

In one embodiment, the first property and the second property are resistance of the first hardware element and the second hardware element, respectively. Alternatively, the first property and the second property are capacitance of the first hardware element and the second hardware element, respectively.

In one embodiment, the first arm and the second arm are opposite arms in the Wheatstone-bridge circuit. Within the target range, one of a gradient of the first property with respect to the temperature and a gradient of the second property with respect to the temperature is positive, and another of the gradient of the first property with respect to the temperature and the gradient of the second property with respect to the temperature is negative.

In one embodiment, the first arm and the second arm are adjacent arms in the Wheatstone-bridge circuit. Within the target range, both a gradient of the first property with respect to the temperature and a gradient of the second property with respect to the temperature are positive, or both a gradient of the first property with respect to the temperature and a gradient of the second property with respect to the temperature are negative.

In one embodiment, a common node between the first arm and the second arm serve as an output terminal of the Wheatstone-bridge circuit. Within the target range, both a temperature coefficient of the first property and a temperature coefficient of the second property are positive, or both a temperature coefficient of the first property and a temperature coefficient of the second property are negative. Further, within the target range, magnitude of the temperature coefficient of the second property is smaller than magnitude of the temperature coefficient of the first property.

In one embodiment, one of the first property and the second property is resistance, and another of the first property and the second property is capacitance.

In one embodiment, the first arm and the second arm are adjacent arms in the Wheatstone-bridge circuit. Within the target range, one of a gradient of the first property with respect to the temperature and a gradient of the second property with respect to the temperature is positive, and another of the gradient of the first property with respect to the temperature and the gradient of the second property with respect to the temperature is negative.

In one embodiment, the first arm and the second arm are opposite arms in the Wheatstone-bridge circuit. Within the target range, both a gradient of the first property with respect to the temperature and a gradient of the second property with respect to the temperature are positive, or both a gradient of the first property with respect to the temperature and a gradient of the second property with respect to the temperature are negative.

In one embodiment, the first hardware element and the second hardware element are attached to different locations of the deformable portion. Alternatively, the first hardware element is attached to the deformable region via the second hardware element. Alternatively, the second hardware element is attached to the deformable region via the first hardware element. In one embodiment, the second property is not sensitive to the deformation of the deformable portion.

In one embodiment, the first property further depends on the second property.

In one embodiment, the first property is resistance or capacitance of the first hardware element.

In one embodiment, the first hardware element is attached to the second hardware element. A first dimension of the first hardware element along a first direction changes in response to a second dimension of the second hardware element along the first direction being changed. The second property is the second dimension. When the temperature at the deformable portion changes within the target range, a fourth change induced into the first property by the first dimension compensates for a third change induced into the first property by the temperature.

In one embodiment, magnitude of a sum of the third change and the fourth change is smaller than magnitude of the third change.

In one embodiment, one is positive and three are negative, or one is negative and three are positive, among a thermal expansion coefficient of the second hardware element, a gradient of the first dimension with respect to the second dimension, a gradient of the first property with respect to the first dimension, and a gradient of the first property with respect to the temperature.

In one embodiment, the second hardware element serves as a part of the deformable portion.

In one embodiment, the first property is resistance. The first hardware element is a strain gauge. Alternatively, the first hardware element includes two contacts separated by a gap, and a contact resistance between the two contacts changes monotonously with a width of the gap.

In a second aspect, an electronic device is provided according to embodiments of the present disclosure. The electronic device includes any forgoing apparatus, the deformable portion, and a hardware module. The hardware module is configured to receive the first signal, and a state of the hardware module changes in response to a state of the first signal being changed.

In one embodiment, the hardware module includes at least one of: a processor, a controller, a display, a speaker, a switch, or an indicator light.

In one embodiment, the electronic devices at least one of: a mobile phone, a watch, glasses, an earbud, a keyboard, or a tablet.

The apparatus and the electronic device are provided according to embodiments of the present disclosure. The sensor generates the first signal, and includes the first hardware element attached to the deformable portion. The first signal depends on the first property of the first hardware element and the second property of the second hardware element. The first property has a dependency on deformation of the deformable portion, and further has a dependency on temperature at the deformable portion in absence of the second hardware element. The second property has a dependency on the temperature at the deformable portion. When the temperature at the deformable portion changes within the target range, the first change and the second change are induced into the first signal through the dependencies of the first property and the second property, respectively, on the temperature. The second change compensates for the first change. The second hardware element counteracts with an influence of the temperature on the first property of the first hardware element, and thus renders the first signal robust to variations in temperature. Therefore, the state of the first signal can indicate the deformation of the deformable portion accurately. Correspondingly, the electronic device applying the apparatus can give an accurate response when the deformation of the deformable portion serves as an input operation.

BRIEF DESCRIPTION OF THE DRAWINGS

Hereinafter briefly described are drawings to be applied in embodiments of the present disclosure or conventional techniques. Other drawings may be obtained by those skilled in the art based on the provided drawings without creative efforts.

FIG. 8 is a schematic graph of a change in signals with respect to a force applied on a deformable portion:

DETAILED DESCRIPTION OF THE EMBODIMENTS

Hereinafter technical solutions in embodiments of the present disclosure are described in conjunction with the drawings in embodiments of the present closure. It is appreciated the described embodiments are only some rather than all of the embodiments of the present disclosure. Any other embodiments obtained based on the embodiments of the present disclosure by those skilled in the art without any creative effort fall within the scope of protection of the present disclosure.

As described in the background, a conventional force-sensitive or strain-sensitive input apparatus is subject to drifting output signals of the force sensor, and thereby gives incorrect result regarding whether the operational interface deforms. Hereinafter details of such technical issue are described, where it is taken as example that the force sensor is based on a strain gauge. Those skilled in the art would appreciate that such technical issue is also applicable mutatis mutandis to other types of force sensor, as long as the force sensor is temperature-sensitive.

Figure 2:
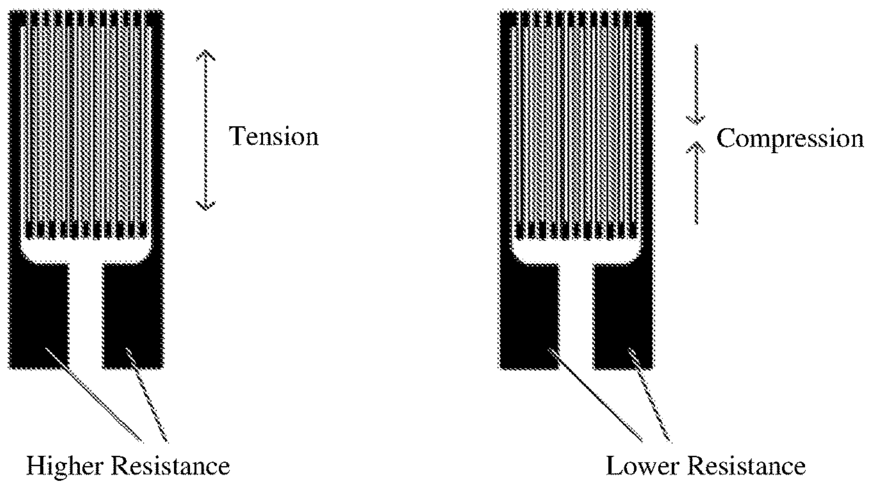
FIG. 2 is a schematic diagram of a strain gauge and operating states of the strain gauge in conventional technology.

Reference is made to FIG. 2, which is a schematic diagram of a strain gauge and operating states of the strain gauge in conventional technology. A strain gauge is configured to measure a strain on an object. A common type of strain gauge may consist of an insulating flexible backing which supports a metallic foil pattern, as shown in FIG. 2. The metallic foil pattern includes a winding pattern, of which a thickness is sensitive to strain, and two terminals at two ends of the winding pattern. The strain gauge may be attached to the object by a suitable adhesive. The foil pattern would deform when the object deforms, and an electrical resistance of the foil pattern changes accordingly. Generally, a compression on the object would thicken the metallic foil pattern, and thereby a resistance of the strain gauge is decreased. On the contrary, a tension on the object would thin the metallic foil pattern, and thereby a resistance of the strain gauge is increased. In practice, the two terminals may be connected into an arm of a Wheatstone bridge, which is a common approach for measuring a resistance.

A typical structure of the Wheatstone bridge includes an upper arm and a lower arm, each of which includes two resistors connected at a common node. Three of the four resistors are of fixed resistances, while the other is of a variable (or to-be-measured) resistance. Two ends of the upper arm are connected to two ends of the lower arm, respectively, and the two connection nodes serve as two output terminals of the Wheatstone bridge. The two common nodes in the upper arm and the lower arm serve as power supply terminals to the Wheatstone bridge. Therefore, in a case that the resistance of the three resistors and a voltage across the two power supply terminals are known, the to-be-measured resistance can be deduced from a voltage between the two output terminals. Those skilled in the art can easily obtain other variants of a Wheatstone-bridge circuit, which are not described in detail herein.

Figure 1:
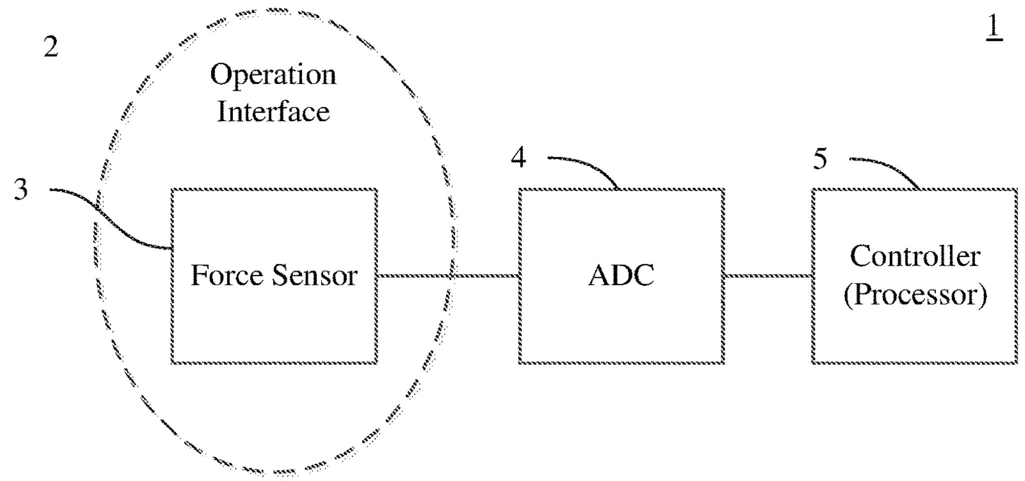
FIG. 1 is a schematic structural diagram of a force-sensitive or strain-sensitive input apparatus of an electronic device in conventional technology.
Figure 3:
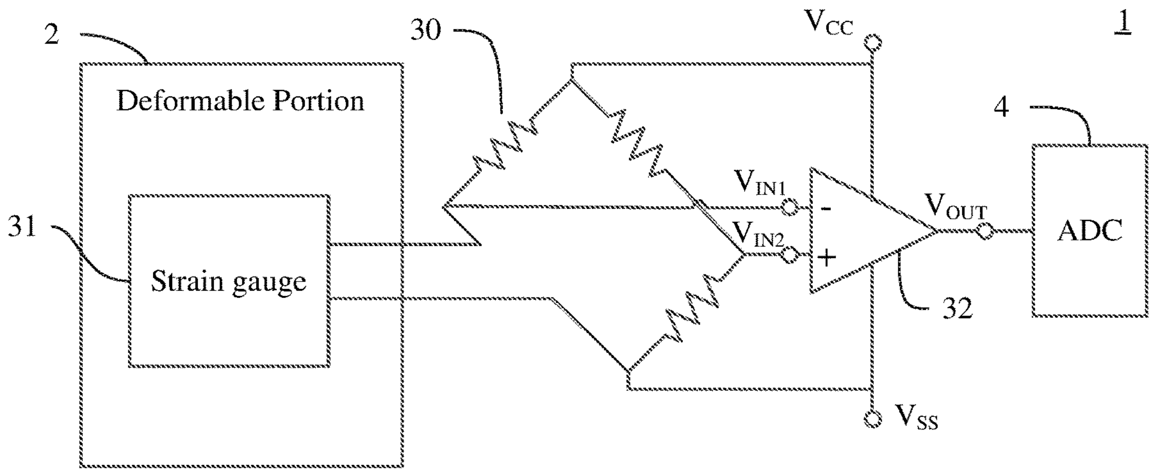
FIG. 3 is a schematic structural diagram of a force-sensitive or strain-sensitive input apparatus based on a strain gauge and a Wheatstone bridge.

Reference is then made to FIG. 3, which is a schematic structural diagram of a force-sensitive or strain-sensitive input apparatus based on a strain gauge and a Wheatstone bridge. The structure as shown in FIG. 3 is on a basis of that shown in FIG. 1, where the force sensor 3 includes a Wheatstone-bridge circuit 30 and an operational amplifier 32. A lower arm of the Wheatstone-bridge circuit 30 includes a strain gauge 31, which serves as the variable (or to-be-measured) resistor, and the strain gauge 31 is disposed on a deformable portion (such as an operation interface) 2 of the electronic device 1. The two output terminals of the Wheatstone-bridge circuit 30 are coupled to an inverting input terminal and a non-inverting input terminal of the operational amplifier 32, respectively. An output terminal of the operational amplifier 32 is coupled to an input terminal of the analog-to-digital converter (ADC) 4. In FIG. 3, signals at the inverting input terminal, the non-inverting input terminal, and the output terminal of the operational amplifier 32 are denoted as $V_{IN1}$, $V_{IN2}$, and $V_{OUT}$, respectively. There is $V_{OUT}=A*(V_{IN1}-V_{IN2})$, where A is the gain of the operational amplifier 32.

Figure 4:
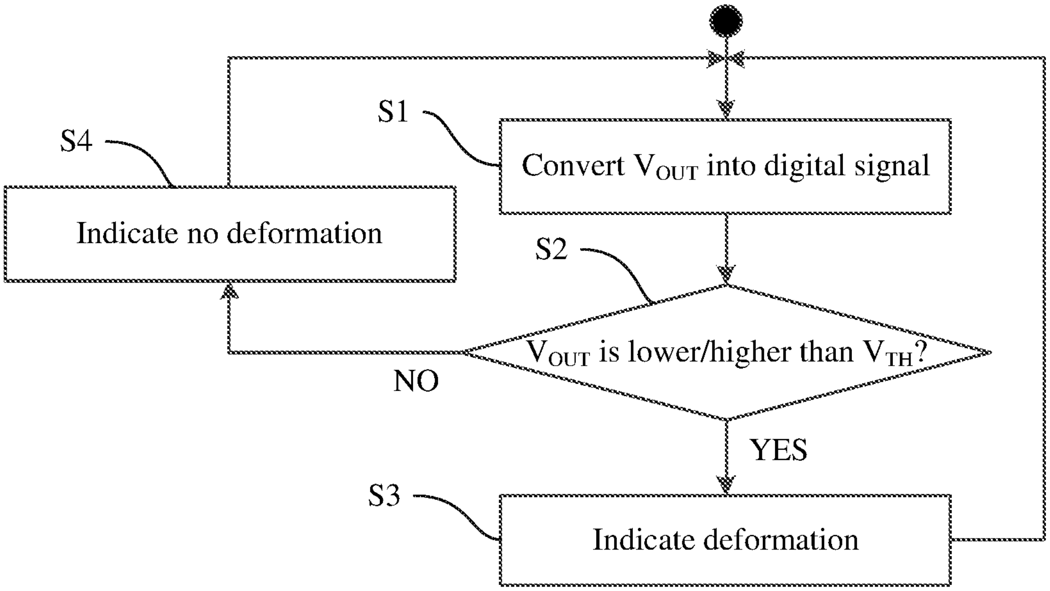
FIG. 4 is an operation algorithm of a comparator operating based on a strain gauge and a Wheatstone bridge.

The ADC may be provided with an algorithm for determining whether the deformation portion 2 deforms, on a basis of the structure as shown in FIG. 3. Reference is made to FIG. 4, which is an operation algorithm of the ADC operating based on a strain gauge and a Wheatstone bridge. In FIG. 4, the operation algorithm includes steps S1 to S4.

In step S1, the output signal $V_{OUT}$ is converted into a digital signal.

The operational amplifier amplifies a difference between the input signals $V_{IN1}$ and $V_{IN2}$ simply to generate the output signal $V_{OUT}$. Therefore, the output signal $V_{OUT}$ is an analog signal. As mentioned in the background, the ADC is configured to compare the output signal $V_{OUT}$ with a threshold signal $V_{TH}$. Generally, a signal should be digital for comparison, and thereby the ADC needs to perform analog-to-digital conversion on the output signal $V_{OUT}$ The threshold signal $V_{TH}$ may be preset as a digital level in the ADC, or may be a digital signal inputted into the ADC. The threshold signal $V_{TH}$ may alternatively be an analog signal inputted into the ADC. In such case, the ADC is further configured to convert the threshold signal $V_{TH}$ into a digital signal.

In step S2, it is determined whether the output signal $V_{OUT}$ is lower (or higher) than the threshold signal $V_{TH}$. The algorithm goes to step S3 in case of positive determination, and goes to step S4 in case of negative determination.

For convenience of illustration, it is assumed that the two input signals $V_{IN1}$ and $V_{IN2}$ of the operational amplifier 32 are balanced, namely, identical in value, in a case that the strain gauge 31 is in a zero-strain state. The zero-strain state refers to that the strain gauge 31 is subject to neither tension nor compression. Those skilled in the art can appreciate various manners to implement such assumption. For example, in FIG. 3, a ratio of a resistance of the left resistor in the upper arm to a resistance of the strain gauge 31 in the zero-strain state is equal to a ratio of a resistance of the right resistor in the upper arm to a resistance of the right resistor in the lower arm. The output signal $V_{OUT}$ of the operational amplifier 32 in case of the zero-strain state is denoted as a reference signal $V_{REF}$. In the aforementioned case, there is $V_{REF}=0$. In a case that the strain gauge 31 is subject to tension or compression, there would be $V_{OUT}>0$ or $V_{OUT}<0$, depending on a material of the strain gauge 31 and a connection manner between the Wheatstone-bridge circuit 30 and the operational amplifier 32. It is appreciated that the reference signal $V_{REF}$ may be another value when the resistances in the Wheatstone-bridge structure are configured in other manners.

Figure 5:
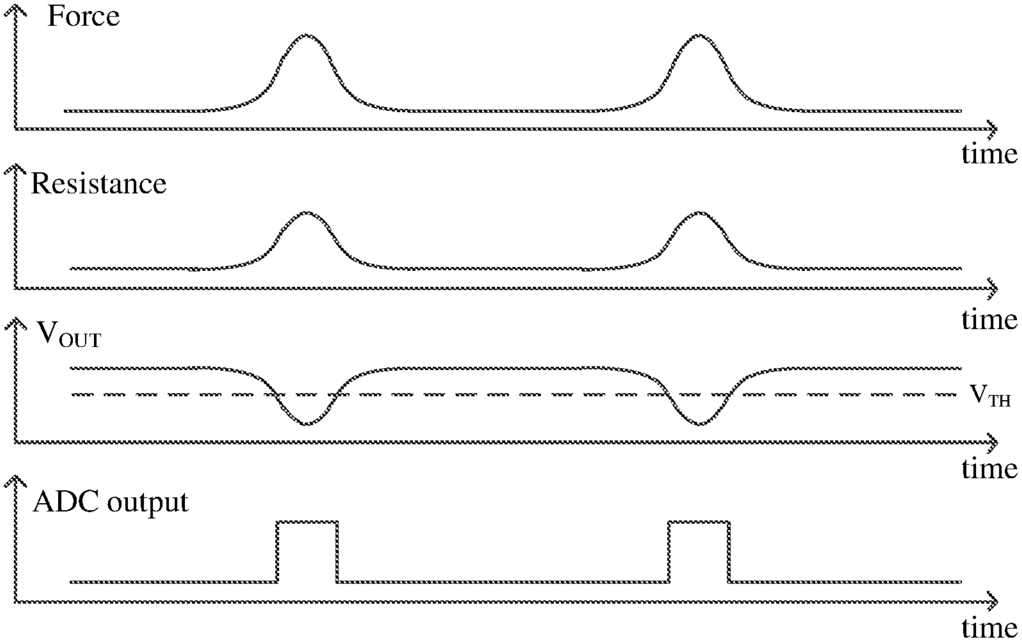

Reference is made to FIG. 5, which is a schematic diagram of a change in signals with respect to a force (or a strain) at a deformable portion. It is taken as an example that the deformation of the deformable portion 2 is induced by an external force, of which a temporal profile is Gaussian-like. In a case that the deformable portion 2 is stretched (for example, a flat surface expanded due to a poke or a press applied by a user), the strain gauge 31 is subject to tension, and thereby the resistance of the strain gauge increases while the resistances of the three resistors in the Wheatstone-bridge circuit is not changed. Assuming the signal $V_{CC}$ is higher than the signal $V_{SS}$ in voltage, the inverting input signal $V_{IN1}$ is increased, while the non-inverting input signal $V_{IN2}$ is unchanged. Accordingly, the output signal $V_{OUT}$ is decreased. In order to discriminate an effective stretch from an unintentional stretch or a noise signal, the threshold signal Vin may be set as a level lower than the reference signal $V_{REF}$ (namely, $V_{TH}<0$ in the aforementioned case).

In step S3, the ADC indicates that the deformable portion deforms.

In step S4, the ADC indicates that the deformable portion does not deform.

Reference is further made to FIG. 5. In a case that the output signal $V_{OUT}$ is lower than the threshold signal $V_{TH}$, it means that the deformation (the tension, or the stretch) is strong enough to be recognized as an effective input signal (for example, a user press a virtual button firmly to switch an electronic device on), and an output signal of the ADC 4 would turn a high level to inform the controller (or the processor) 5 to perform an operation corresponding to the deformation (for example, switching the electronic device on). In a case that the output signal $V_{OUT}$ is higher than or equal to the threshold signal $V_{TH}$, it means that the deformation (the tension, or the stretch) is not strong enough to be recognized as an effective input signal (for example, a user touch the virtual button unintentionally), and an output signal of the ADC 4 would turn a low level and do not inform the controller (or the processor) 5 to perform the corresponding operation. In other words, the ADC 4 is capable to indicate whether the deformation portion deforms through a state of the output signal of the ADC 4.

The accuracy of the above algorithm depends on that the resistance of the strain gauge 31 can accurately reflect information of the force (or strain) at the deformable portion. Such accuracy deteriorates when taking into the account that the force sensor 3 is sensitive to temperature.

Generally, the temperature coefficient of resistance of metal materials is greater than zero. Since the strain gauge 31 is attached to the deformable portion 2, the resistance of the metallic foil pattern in the strain gauge 31 is in a positive correlation with the temperature of the deformable portion 2. That is, a rise in resistance is expected when the temperature of the deformable portion 2 increases, and a drop in resistance is expected when the temperature of the deformable portion 2 decreases.

Figure 6:
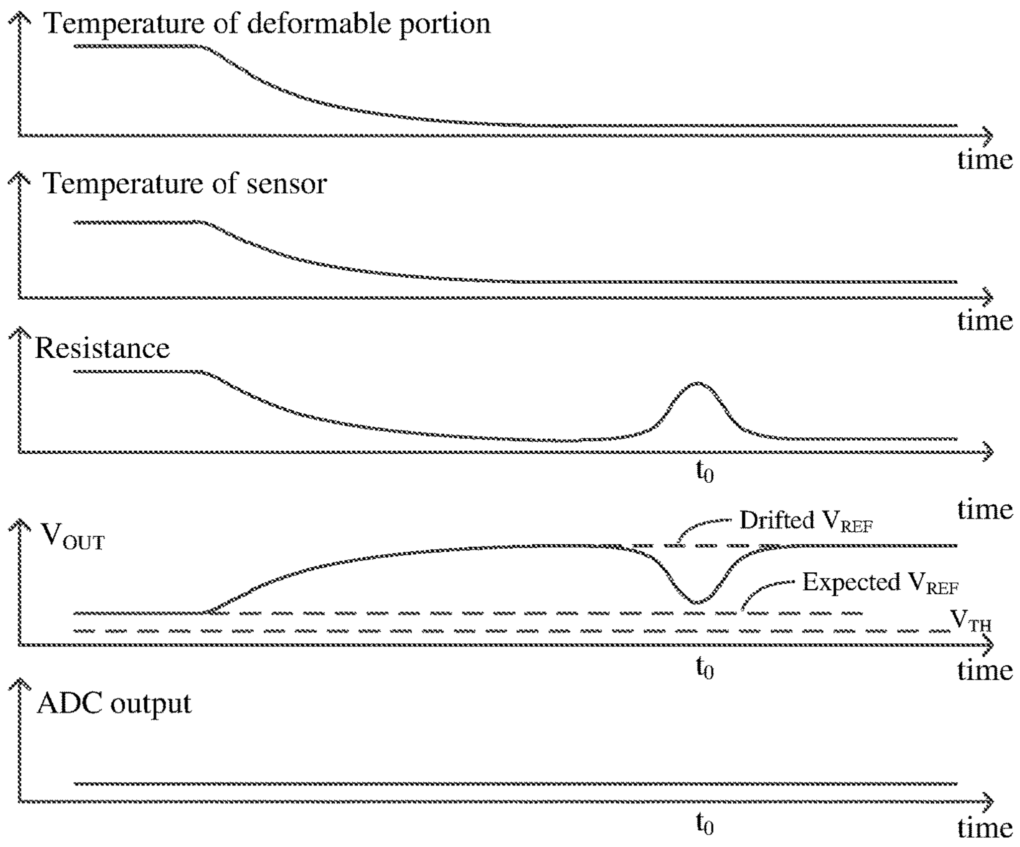
FIG. 6 is a schematic graph of a change in signals with respect to a force and temperature of a deformable portion.

Reference is made to FIG. 6, which is a schematic diagram of a change in signals with respect to a force (or a strain) and temperature of a deformable portion. It is taken as an example in FIG. 6 that temperature of the deformable portion 2 is subject to a gradual decrease. For example, the temperature of the deformable portion close to a central processing unit (CPU) may be decreased when the electronic device is switched from a turbo-mode to an eco-mode, or the temperature of the deformable portion attached to a metal housing may be decreased when a wearable device is detached from the human body. Apparently, the temperature of the strain gauge 31 would follow a similar change in that of the deformable portion 2, and the resistance of the strain gauge 31 is decreased accordingly. In such case, the inverting input signal $V_{IN1}$ is gradually decreased even when there is no squeeze (or tension) applied on the deformable portion 2, and thereby the actual reference signal $V_{REF}$ would drift to a level higher than the expected reference signal $V_{REF}$.

Around a moment to when the temperature has already been decreased, an external force same as the one induces the deformation as shown in FIG. 5 is applied to the deformable portion and serves an input operation. The force leads to a valley similar to those in FIG. 5. Namely, the output signal $V_{OUT}$ should dip from the reference signal $V_{REF}$ to a level lower than the threshold defined by the threshold signal $V_{TH}$, in a case that a difference between the reference signal $V_{REF}$ and the threshold signal $V_{TH}$ remains at an expected position. Nevertheless, since the reference signal $V_{REF}$ has drifted to a level above the expected portion, a difference between the actual (drifting) reference signal $V_{REF}$ and the threshold signal $V_{TH}$ is enlarged, and even a bottom of the valley may not reach the threshold defined by the threshold signal $V_{TH}$. Accordingly, a result of the comparison of the ADC 4 indicates that the output signal $V_{OUT}$ is kept higher than the threshold signal $V_{TH}$, therefore the ADC 4 would not turn the output signal thereof into an active state (such as a high level), and the controller (or processor) 5 is not informed of the deformation of the deformable portion. As a result, the electronic device may "miss" the input operation around the moment ta and give no response.

According to embodiments of the present disclosure, a novel structure of an apparatus for force sensing is proposed, where another hardware element is provided to compensate for the change induced by temperature into the signal outputted from the sensor, such that the signal is merely or mainly determined based on deformation of the deformable portion.

Figure 7:
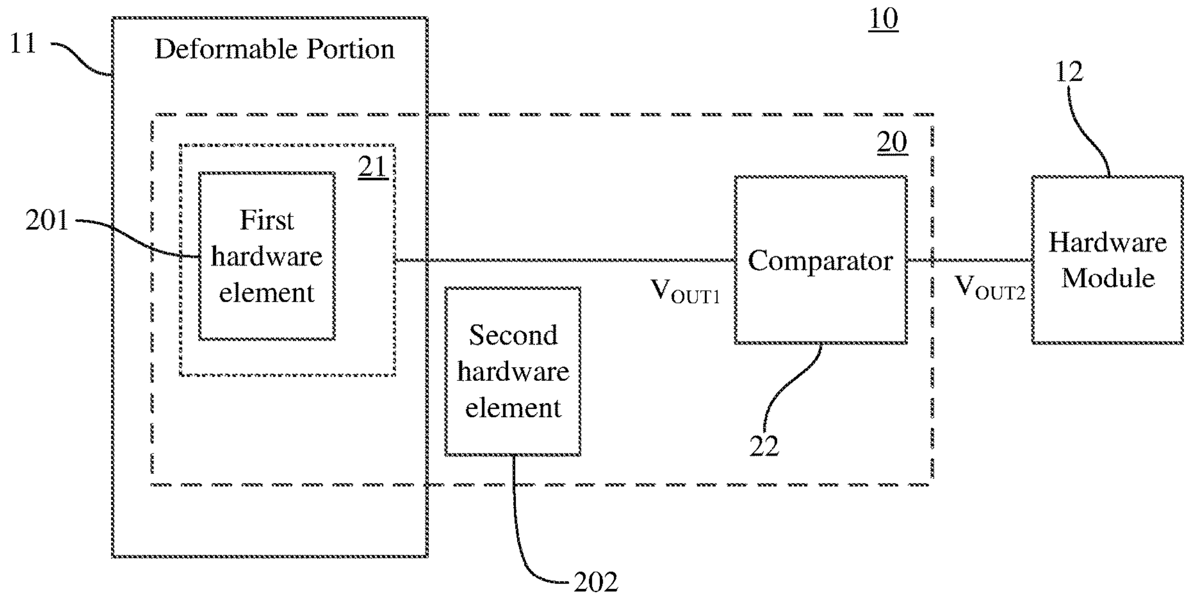
FIG. 7 is a schematic structural diagram of an electronic device applying an apparatus for force sensing according to an embodiment of the present disclosure.

Reference is made to FIG. 7, which is a schematic structural diagram of an electronic device applying an apparatus for force sensing according to an embodiment of the present disclosure. An apparatus 20 for force sensing is applied in an electronic device 10, and the electronic device 10 includes a deformable portion 11. The electronic device 10 may include a mobile phone, a watch, glasses, a head-mounted display device, an earbud, a keyboard, a tablet, or the like. The deformable portion may be a flexible display of a mobile phone, a wristband of a watch, an elastic frame of glasses or of a head-mounted display device, a metal or plastic housing of an earbud, a membrane of a keyboard, a resilient home key of a tablet, or the like. It is appreciated that the electronic device 10 and the deformable portion 11 are not limited to the above cases, and specific examples are not numerated herein for conciseness.

The apparatus 20 includes a sensor 21. In order to facilitate illustration, only one sensor 21 is shown in FIG. 7. Unless otherwise described, those skilled in the art can appreciate that following description regarding the sensor 21 is also applicable mutatis mutandis to a case of multiple sensors 21.

The sensor 21 is configured to generate a first signal $V_{OUT}$, and includes a first hardware element 201 attached to the deformable portion 11. The first signal $V_{OUT1}$ depends on a first property of the first hardware element 201, and the first property has a dependency $m_0$ on deformation of the deformable portion. The apparatus further includes a second hardware element 202. The first signal $V_{OUT1}$ depends on a second property of the second hardware element 201, and the second property has a dependency ma on temperature at the deformable portion. The first property further has another dependency $m_1$ on the temperature at the deformable portion, in absence of the second hardware element 202. When the temperature at the deformable portion changes within a target range, a first change is induced into the first signal $V_{OUT1}$ through the dependency $m_1$ of the first property on the temperature, and a second change is induced into the first signal through the dependency m; of the second property on the temperature. The second change compensates for the first change.

Herein the "absence of the second hardware element 202" refers to an assumed condition that there is no second hardware element 202 (more specifically, no dependency $m_2$) in the apparatus 20. Namely, the apparatus 20 is such configured that when the second hardware element 202 is removed from the apparatus 20 (more specifically, when the dependency $m_2$ is not considered), the first property would present the dependency nu on the temperature at the deformable portion. It is appreciated that such assumed condition is different from practical operation of the apparatus 20. During the operation of the apparatus 20, the second hardware element 202 actually serves as a part of the apparatus 20, and the first property may still present the dependency $m_1$, or may present a dependency on the temperature that is weaker than the dependency $m_1$, or may present no dependency on the temperature at all, all of which would be described hereinafter.

The first hardware element 201 may be implemented in various forms, as long as the first property is sensitive to deformation and temperature (in absence of the second hardware 202) at deformable portion 11. In this embodiment, the first hardware element 201 is mainly configured to detect the deformation of the deformable portion 11. Such detection is implemented through the first property, which is influenced by the deformation of the deformable portion 11. In some embodiments, the first property may be an electrical property of the first hardware element 201, such as resistance, inductance, or capacitance of the first hardware element 201. As an example, the first hardware element 201 is a strain gauge. As another example, the first hardware element 201 includes two contacts separated by a gap, and a contact resistance (or inductance) or a capacitance between the two contacts changes monotonously with a width of the gap. In a case that the deformable portion 11 deforms, the first hardware element 201 deforms along with the deformable portion 11, or the first hardware element 201 is at least subject to a strain due to deformation of the deformable portion 11. In a case that temperature of the deformable portion 11 changes (for example, the deformable portion 11 is heated or cooled), the temperature of the first hardware element 201 also changes due to thermal conduction from the deformable portion 11. It this embodiment, the deformation, the heating, or the cooling of the first hardware element 201 would all influence the first property of the first hardware element 201, and hence variations of the first property can be expected in such cases. That is, the aforementioned detection based on the first property may not reflect the deformation accurately due to its additional dependency on the temperature.

Similarly, the second hardware element 202 may be implemented in various forms, as long as the second property is sensitive to the temperature at the deformable portion. The second hardware element 202 may be independent from the sensor 21, as shown in FIG. 7. It is appreciated that such independence may be either physical or electrical. That is, the second hardware element 202 may be physically independent from the sensor 21 but electrically connected to the sensor 21, or the vice versa. Alternatively, the second hardware element 202 may serve as a part of the sensor 21 other than the first hardware element 201. In some embodiments, the second property may be an electrical property or a physical property. Similar to the first property, variations in the electrical property of the second hardware element 202 are expected when the temperature of the deformable portion 11 changes. Herein the physical property may refer to, for example, a dimension of the second hardware element 202, as described herein later. Such dimension is subject to thermal expansion in case of a change in temperature of the hardware element 202.

In this embodiment, the first hardware element 201 is directly or indirectly attached to the deformable portion 11. The second hardware element 202 may or may not be attached to the deformable portion 11, which is not limited herein. As examples, the second hardware element 202 is directly or indirectly attached to the deformable portion 11, as shown FIGS. 11*a* to 11*d*. In such cases, heat can be conducted from the deformable portion 11 directly or via the first hardware element 201 (indirectly), and in the latter case temperature of the second hardware element 202 would be close to that of the first hardware element 201. As another example, the second hardware element 202 may be separated from the deformable portion by a gap. In such case, the heat can be transmitted through air conduction or radiation, and the second hardware element 202 is less affected by, or even immune to, deformation of the deformable portion 11.

Since the first signal $V_{OUT1}$ depends on the first property and the second property, it would ultimately depends on the deformation of the deformable portion 11 and the temperature at the deformable portion 11. When the temperature changes, both the dependency $m_1$ and the dependency $m_2$ tend to induce changes, i.e. the first change $\delta_1$ and the second change $\delta_2$, into the first signal $V_{OUT1}$. When taken alone, each of the first change of and the second change $\delta_2$ can be regarded as the temperature drift, and are undesirable for implementing a force sensing apparatus immune to variations in temperature. In embodiments of the present disclosure, however, the second change $\delta_2$ is capable to compensate for the first change of within the target range. Herein the target range refers to a preset range of temperature in which the compensation is performed. In practice, the target range may be all or a part of a range of possible temperature of the deformable formable portion 11 during normal operation of the apparatus 20.

Magnitude the first change or is suppressed due to the compensation of the second change $\delta_2$. Namely, in some embodiments, magnitude of a sum of the first change $\delta_1$ and the second change $\delta_2$ is smaller than magnitude of the first change $\delta_1$, i.e. $|\delta_1+\delta_2|<|\delta_1|$. An equivalent expression may be $\delta_1\cdot\delta_2<0$ and $|\delta_2<2|\delta_1|$. Generally, $|\delta_2|<|\delta_1|$ is called under-compensation (or partial compensation), $|\delta_2|=|\delta_1|$ or $\delta_2=-\delta_1$ is called complete compensation (or exact compensation), and $|\delta_1|<|\delta_2|<2|\delta_1|$ is called over-compensation. Specifically, $\delta_1\cdot\delta_2<0$ means that one of the first change $\delta_1$ and the second change of may be positive, while the other is negative. Hence, the second change counteracts the first change, such that the overall temperature drift is greatly abated or even eliminated from the first signal $V_{OUT1}$.

In one embodiment, the apparatus 20 further includes a comparator 22, as shown in FIG. 7. The comparator 22 is configured to receive the first signal $V_{OUT1}$. It is appreciated that the reception of the first signal $V_{OUT1}$ may be implemented by coupling an output terminal of the sensor to an input terminal of the comparator 22. The comparator 22 may be an AD comparator, or may include an AD converter and a processor for comparing digital signals. In some embodiments, multiple comparators 22 may be configured to receive the second signal $V_{OUT1}$. Hereinafter the discussion is mainly focused on one comparator 22, and it is appreciated that such discussion may also be applied to each of the multiple comparators 22.

The comparator 22 is configured to determine whether the deformable portion 11 deforms, based on the first signal $V_{OUT1}$ and a threshold signal $V_{TH}$ (not shown). As mentioned above, the first hardware element 201 of the sensor 21 is attached to the deformable portion 11, and deformation of the deformable portion 11 is capable to be reflected by the first property. Therefore, the first signal $V_{OUT1}$ depending on the first property can serve as a basis for the determination. The threshold signal $V_{TH}$ corresponds to a degree of the deformation (of the deformable portion 11, or of the first hardware 201 of the sensor 21 correspondingly) which is to be recognized by the electronic device 10. The threshold signal $V_{TH}$ may be preset as a digital level in the comparator 22, or may be a digital signal inputted into the comparator 22. Alternatively, the threshold signal $V_{TH}$ may be an analog signal inputted into the comparator 22, and the comparator 22 converts the threshold signal $V_{TH}$ into a digital signal before applying the threshold signal $V_{TH}$. The comparator 22 may determine whether the deformable portion 11 deforms in various manners. In one embodiment, the determination is carried out by comparing levels of the first signal $V_{OUT1}$ and the threshold signal $V_{TH}$. In a case that there are multiple comparators 22, the threshold signal $V_{TH}$ of different comparators 22 may be same or different.

The comparator 22 is further configured to generate a second signal $V_{OUT2}$, which is in an active state in response to determining that the deformable portion 11 deforms or the deformation of the deformable portion reaches a preset degree. The specific active state of the second signal $V_{OUT2}$ is based on a practical situation, which is not limited herein, as long as the active state is distinguishable in the second signal $V_{OUT2}$ and serves as an indication of the deformation of the deformable portion 11. For example, the active state may be a high level or "1", or may be a low level or "0".

An operating algorithm of the comparator 22 may be as similar to that as shown in FIG. 4. An exemplary operating algorithm may include: converting the first signal $V_{OUT1}$ into a digital signal (which is optional); determining whether the second signal $V_{OUT2}$ is lower (or higher) than the threshold signal $V_{TH}$: outputting the second signal $V_{OUT2}$ in the active state in case of positive determination; and outputting the second signal $V_{OUT2}$ in the inactive state in case of negative determination. The active state indicates that the deformable portion 11 deforms (e.g. to a preset deformation degree). The inactive state is one or more states of the second signal $V_{OUT2}$ other than the active state, and indicates that the deformable portion 11 does not deform (e.g. to the preset deformation degree). It is appreciated that the above operating algorithm is merely an example, and the comparator 22 may apply another operating algorithm in practice.

The second signal $V_{OUT}$ may be transmitted to a hardware module 12 of the electronic device 10, as shown in FIG. 7. The hardware module 12 is configured to receive the second signal $V_{OUT2}$, and a state of the hardware module 12 changes in response to a state of the second signal $V_{OUT2}$ being changed. It is appreciated that the comparator 22 as shown in FIG. 7 may be omitted, and the first signal $V_{OUT1}$ is directly transmitted to a hardware module 12 of the electronic device 10. In such case, the hardware module 12 is configured to receive the first signal $V_{OUT1}$, and a state of the hardware module 12 changes in response to a state of the first signal $V_{OUT1}$ being changed.

As an example, the hardware module 12 may be a switch transistor, where the switch transistor is switched on when the first signal $V_{OUT1}$ rises above a threshold, and is switched off when the first signal $V_{OUT1}$ falls below the threshold. Alternatively or additionally, the switch transistor is switched on when the second signal $V_{OUT}$ is a high level, and is switched off when the second signal $V_{OUT2}$ is a low level. For another example, the hardware module 12 may be a processing circuit or a processing element on an integrated circuit for processing the first signal $V_{OUT1}$ or the second signal $V_{OUT2}$.

In the apparatus 20 for force sensing according to above embodiments of the present disclosure, the sensor 21 generates the first signal $V_{OUT1}$, and includes the first hardware element 201 attached to the deformable portion 11. The first signal $V_{OUT1}$ depends on the first property of the first hardware element 201 and the second property of the second hardware element 202. The first property has a dependency me on deformation of the deformable portion, and a dependency m; on temperature at the deformable portion in absence of the second hardware element 202. The second property has a dependency $m_2$ on the temperature at the deformable portion. When the temperature at the deformable portion changes within the target range, the first change and the second change are induced into the first signal through the dependencies $m_1$ and $m_2$, of the first property and the second property on the temperature, respectively, and the second change compensates for the first change. The second hardware element counteracts with an influence of the temperature on the first property of the first hardware element, and thus renders the first signal $V_{OUT1}$ robust to variations in temperature. Therefore, the state of the first signal $V_{OUT1}$ can indicate the deformation of the deformable portion 11 accurately. Correspondingly, the electronic device 10 applying the apparatus 20 can give an accurate response when the deformation of the deformable portion 11 serves as an input operation.

Hereinafter some embodiments are further provided for better understanding of technical solutions of the present disclosure. The present disclosure is not limited to these embodiments.

Figure 8A:
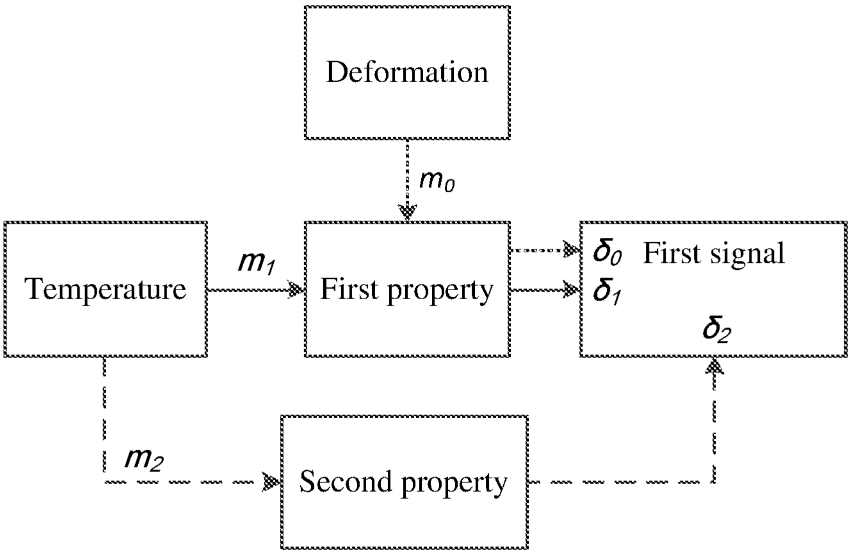
FIGS. 8*a* to 8*c* are schematic diagrams of a temperature compensation process of an apparatus for force sensing according to various embodiments of the present disclosure.

Reference is made to Figure Sa, which is a schematic diagram of a temperature compensation process of an apparatus for force sensing according to an embodiment of the present disclosure. In one embodiment, the first property is independent from the second property. As shown in FIG. 8*a*, the first signal $V_{OUT1}$ depends directly on the first property and the second property, and ultimately on the deformation of the deformable portion 11 and the temperature at the deformable portion 11. The deformation and the temperature determine the first property through dependencies $m_0$ and my, respectively. Via the first property, the deformation induces a change do, which is also called a target change herein, into the first signal $V_{OUT1}$ (i.e. the dotted arrows in FIG. 8*a*), while the temperature induces the first change $\delta_1$ into the first signal $V_{OUT1}$ (i.e. the solid arrows in FIG. 8*a*). The temperature further determines the second property through the dependencies $m_2$, and thereby induces the second change $\delta_2$ into the first signal $V_{OUT1}$ via the second property (i.e. the dashed arrows in Figure Sa). In this embodiment, the first property has no dependency on the second property, and the second change $\delta_2$ is merely induced into first signal $V_{OUT1}$ directly from the second property. In the first signal $V_{OUT1}$, the second change 62 compensates for the first change $\delta_1$. That is, $|\delta_1+\delta_2|<|\delta_1|$ as mentioned above. Therefore, a sum of the first change $\delta_1$ and the second change $\delta_1$ would lead to a small variation or even zero variation in the first signal $V_{OUT1}$. Since both the first change $\delta_1$ and the second change $\delta_2$ present a whole influence from the temperature, the first signal $V_{OUT1}$ would present robustness to the changes in the temperature. The target change do that comes from the deformation is not affected, and therefore the first signal $V_{OUT1}$ is still sensitive to the deformation of the deformable portion.

Figure 8B:
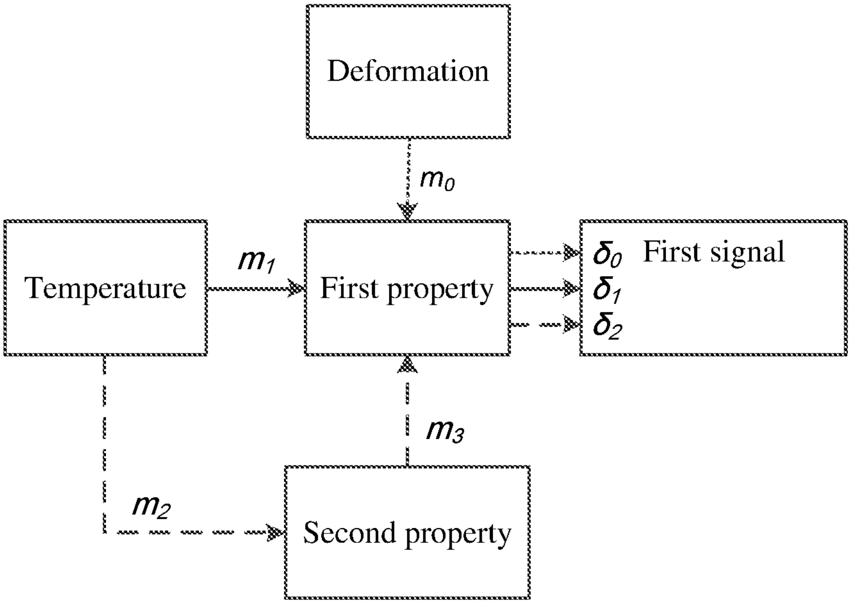

Reference is made to FIG. 8*b*, which is a schematic diagram of another temperature compensation process of an apparatus for force sensing according to an embodiment of the present disclosure. In an alternative embodiment, the first property further depends on second property. As shown in FIG. 8*b*, the first signal $V_{OUT1}$ depends directly on the second property. Since the first property depends partially on the second property through a dependency ma, the first signal $V_{OUT1}$ depends indirectly on the second property. Similar to the previous embodiment, the first signal $V_{OUT1}$ depends ultimately on the deformation of the deformable portion 11 and the temperature at the deformable portion 11. The deformation still determines the first property through the dependencies $m_0$, and induces the target change $\delta_0$ n into the first signal $V_{OUT1}$ via the first property (i.e. the dotted arrows in FIG. 8*b*). The temperature determines the first property directly through the dependency $m_1$, and induces the first change $\delta_1$ into the first signal $V_{OUT1}$ via the first property (i.e. the solid arrows in FIG. 8*b*). Different from the previous embodiment, the temperature further determines the first property indirectly via the second property, namely, through the dependencies $m_2$ and $m_3$. Accordingly, the temperature further induces the second change $\delta_1$ into the first signal $V_{OUT1}$, via the second property and the first property (i.e. the dashed arrows in FIG. 8*b*). In this embodiment, the compensation with respect to changes brought by the temperature not only takes place in the first signal $V_{OUT1}$, as described in the previous embodiment, but also takes place in the first property. That is, a change induced into the first property by the second property directly compensates, partially or completely, for a change induced into the first property by the temperature. Thereby, the first property itself is subject to a small variation or even zero variation under the changes in the temperature, which eventually leads robustness of the first signal $V_{OUT1}$.

Figure 8C:
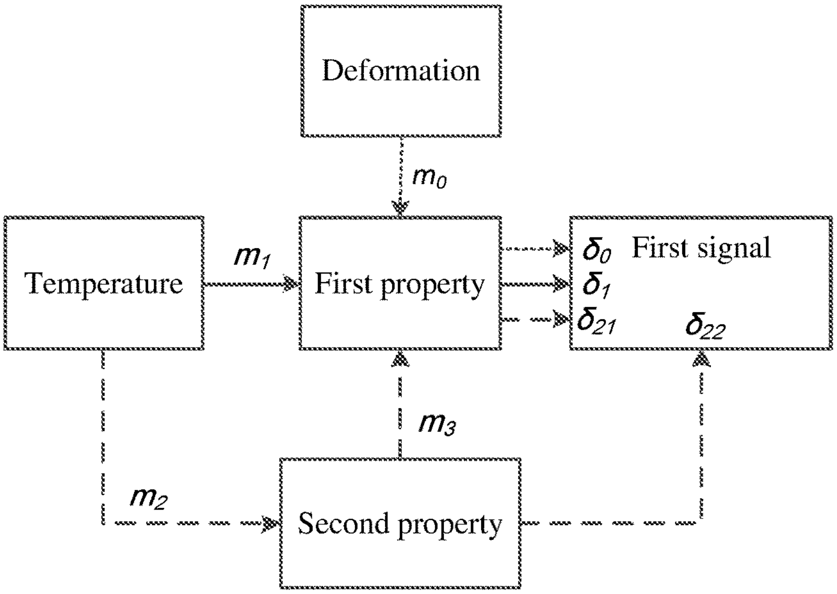

It is appreciated that Figure Sa and Figure Sb are merely exemplary embodiments, and the present disclosure is limited thereto. In an embodiment, a combination of the above two embodiments is also feasible for temperature compensation. Namely, both the first property and the first signal $V_{OUT1}$ depend, directly and partially, on the second property. In such case, a part $\delta_{21}$ of the second change $\delta_2$ is induced into the first signal $V_{OUT1}$ via the second property and the first property, and another part $\delta_{22}$(e.g. $\delta_2=\delta_{21}+\delta_{22}$) of the second change 62 is induced into the first signal $V_{OUT1}$ via the second property and not via the first property, as shown in FIG. 8*c*. Details of $\delta_{21}$ and $\delta_{22}$ may refer to the description in relation to the second change $\delta_2$ in FIGS. 8*b* and 8*a*, respectively, and thus are not repeated herein.

Hereinafter first introduced are some embodiments corresponding to the process as shown in Figure Sa, i.e. the first property does not depend on the second property.

Figure 9A:
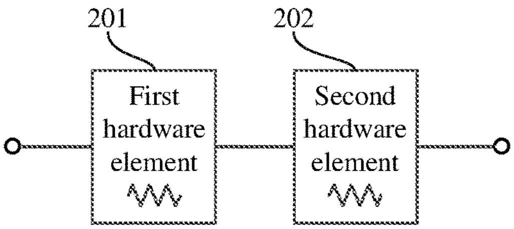
FIG. 9*a* is a schematic diagram of a serial connection between a first hardware element and a second hardware element according to an embodiment of the present disclosure.

In one embodiment, the first property is resistance of the first hardware element 201, and the second property is resistance of the second hardware element 201. The first hardware element and the second hardware element are connected in series. Reference is made to FIG. 9*a*. In this embodiment, with the target range, one of a gradient of the first property with respect to the temperature and a gradient of the second property with respect to the temperature is positive, and another of the gradient of the first property with respect to the temperature and the gradient of the second property with respect to the temperature is negative. Further, within the target range, magnitude of the gradient of the second property with respect to the temperature is smaller than two times magnitude of the gradient of the first property with respect to the temperature. That is, there is $dR_1/dT \times dR_2/dT<0$ and $dR_2/dT/<2|dR_1/dT|$, where T represents temperature at the deformable portion 11, and $R_1$ and $R_2$ represent resistance of the first hardware element 201 and the second hardware element 202, respectively.

Specifically, referring to FIG. 8*a*, the first signal $V_{OUT1}$ is a function of the first property and the second property, i.e. $V_{OUT1}(R_1, R_2)$, due to the dependencies $m_1$ and $m_2$. Further, the first property R1 and the second property R2 are both function of the temperature T, and thereby there is $\delta_1=dV_{OUT1}/dR_1 \cdot dR_1/dT$ and $\delta_2=dV_{OUT1}/dR_2 \cdot dR_2/dT$. The serial connection determines influences of $R_1$ and $R_2$ on the first signal $V_{OUT1}$ to be identical, namely, $dV_{OUT1}/dR_1=dV_{OUT1}/dR_2$. Based on the above relationships, the compensation of $\delta_2$ for $\delta_1$ in this embodiment can be achieved when $dR_1/dT \times dR_2/dT<0$ and $dR_2/dT|<2|dR_1/dT)$.

As an example, the first hardware element and the second hardware element may be of a resistor type. For example, the first hardware is a strain-sensitive resistor such as a strain gauge, and the second hardware is a temperature-sensitive resistor. In such case, the gradient $dR_1/dT$ of the first property with respect to the temperature may be expressed in relation to the thermal coefficient of resistance (TCR) of the first hardware element 201, and the gradient $dR_2/dT$ of the second property with respect to the temperature may be expressed in relation to the TCR of the second hardware element 202. It is appreciated that the first and second hardware elements may be implemented in other forms than the resistor type, as long as the resistance thereof is sensitive to the temperature.

Figure 9B:
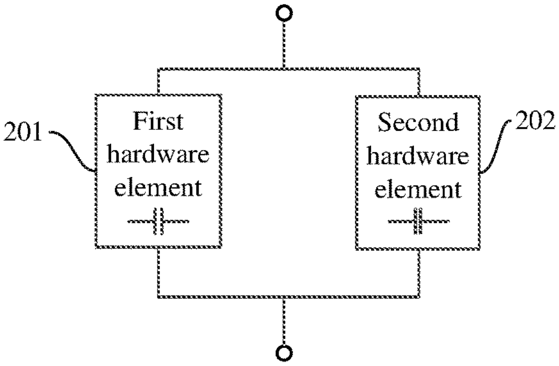
FIG. 9*b* is a schematic diagram of a parallel connection between a first hardware element and a second hardware element according to an embodiment of the present disclosure.

In another embodiment, the first property is capacitance of the first hardware element 201, and the second property is capacitance of the second hardware element 201. The first hardware element and the second hardware element are connected in parallel. Reference is made to FIG. 9*b*. In this embodiment, with the target range, one of a gradient of the first property with respect to the temperature and a gradient of the second property with respect to the temperature is positive, and another of the gradient of the first property with respect to the temperature and the gradient of the second property with respect to the temperature is negative. Further, within the target range, magnitude of the gradient of the second property with respect to the temperature is smaller than two times magnitude of the gradient of the first property with respect to the temperature. That is, there is $dC_1/dT \times dC_2/dT<0$ and $|dC_2/dT|<2|dC_1/dT|$, where T represents temperature at the deformable portion 11, and $C_1$ and $C_2$ represent capacitance of the first hardware element 201 and the second hardware element 202, respectively.

Specifically, referring to FIG. 8*b*, the first signal $V_{OUT1}$ is a function of the first property and the second property, i.e. $V_{OUT1}(C_1, C_2)$, due to the dependencies $m_1$ and $m_2$. Further, the first property C1 and the second property C2 are both function of the temperature T, and thereby there is $\delta_1=dV_{OUT1}/dC_1 \cdot dC_1/dT$ and $\delta_2=dV_{OUT1}/dC_2 \cdot dC_2/dT$. The parallel connection determines influences of $C_1$ and $C_2$ on the first signal $V_{OUT1}$ to be identical, namely, $dV_{OUT1}/dC_1=dV_{OUT1}/dC_2$. Based on the above relationships, the compensation of $\delta_2$ for $\delta_1$ in this embodiment can be achieved when $dC_1/dT \times dC_2/dT<0$ and $|dC_2/dT|<2|dC_1/dT|$.

As an example, the first hardware element and the second hardware element may be of a capacitor type. For example, the first hardware is a strain-sensitive capacitor, and the second hardware is a temperature-sensitive capacitor. In such case, the gradient of the first property $dC_1/dT$ with respect to the temperature may be expressed in relation with the thermal coefficient of capacitance (TCC) of the first hardware element 201, and the gradient of the second property $dC_2/dT$ with respect to the temperature may be expressed in relation with the TCC of the second hardware element 202. It is appreciated that the first and second hardware elements may be implemented in other forms than the capacitor type, as long as the capacitance thereof is sensitive to the temperature.

In one embodiment, with the target range, a product of the first property and temperature coefficient of the first property is equal to a product of the second property and temperature coefficient of the second property. When the deformable portion 11 is heated or cooled within the target range, such condition would ensure that the first property and the second property are always changed by a same amount toward different directions. As discussed above, when the second change $\delta_2$ compensates for the first change $\delta_1$ completely, there is $dR_1/dT=-dR_2/dT$ for the resistor-type case and $dC_1/dT=-dC_2/dT$ for the capacitor-type case. Considering the definition of the temperature coefficients of resistance $TCR \cdot dT=dR/R$ and temperature coefficients of resistance $TCC \cdot dT=dC/C$, there is $R_1 \cdot TCR=-R \cdot TCR_2$ for the resistor-type case and $C_1 \cdot TCC_1=-C_2 \cdot TCC_2$ for the capacitor-type case. $TCR_1$ and $TCR_2$ represent temperature coefficients of resistance of the first hardware element 201 and the second hardware element 202, respectively. $TCC_1$ and $TCC_2$ represent temperature coefficients of capacitance of the first hardware element 201 and the second hardware element 202, respectively. Such equations would lead to total counteraction between the first change $\delta_1$ and the second change $\delta_2$, i.e. the complete compensation of $\delta_2=-\delta_1$ As an example, $R_1$ and $R_2$ are 10 kohm and 500 ohm, respectively, for a reference state (e.g, when the deformable portion 11 does not deform and is at a reference temperature) of the sensor 21. In such case. $TCR_2$ is set to be a negative of 20 times $TCR_1$ to achieve the compensation. For example, $TCR_1$ and $TCR_2$ are −0.05%/K and 0.4%/K, respectively.

Similarly, the under compensation or the over compensation can be achieved in a case that a product of the first property and temperature coefficient of the first property is substantially equal to a product of the second property and temperature coefficient of the second property within the target range. Specifically, assuming both $R_1$ and $R_2$ are positive, there is $TCR_1 \cdot TCR_2<0$, and $R_2 \cdot |TCR_2|<R_1 \cdot |TCR_1|$ for under compensation and $R_1 \cdot |TCR_1|<R_2 \cdot |TCR_2|<2R_1 \cdot |TCR_1|$ for over compensation. Assuming both $C_1$ and $C_2$ are positive, there is $TCC_1 \cdot TCC_2<0$, and $C_2 \cdot TCC_2|<C_1 \cdot |TCC_1|$ for under compensation and $C_1 \cdot |TCC_1|<C_2 \cdot |TCC_2|<2C_1 \cdot |TCC_1|$ for over compensation.

Moreover, when the first property and the second property are electrical properties, the first hardware element 201 and the second hardware element 202 may be incorporated into a more complex sensing circuit. In some embodiments, the sensor 21 includes a Wheatstone-bridge circuit 211. The Wheatstone bridge is an efficient approach to accurately measure the electrical characteristic of the strain-sensitive element, especially when the electrical characteristic is related to the inductance or the capacitance. Generally, the Wheatstone-bridge circuit 211 includes four arms that form a loop through end-to end connection. The loop includes four nodes that connecting each pair of adjacent arms, in which two nodes not belonging to a same arm serve as output terminals of the Wheatstone-bridge circuit 211, while the other two nodes are generally connected to power supplies and serve as power terminals. A first arm of the four arms includes the first hardware element 201, and a second arm of the four arms includes the second hardware element 202. A signal outputted from the output terminals of the Wheatstone-bridge circuit 211 may serve as the first signal $V_{OUT1}$ directly, or may be processed by another circuit to generate the first signal $V_{OUT1}$. In one embodiment, an amplifier circuit 212 may be provided to amplify the signal outputted from the output terminals. The amplifier circuit 212 includes an operational amplifier 2120 for implementing the amplification. An inverting input terminal and a non-inverting input terminal of the operational amplifier 2120 are coupled to the two output terminals, respectively, of the Wheatstone-bridge circuit 211. The first signal $V_{OUT1}$ may be, or at least include, a signal outputted from the output terminal of the operational amplifier 2120.

Hereinafter it is taken as an example that the sensing circuit includes the Wheatstone-bridge circuit 211 and the amplifier circuit 212, and the first signal $V_{OUT1}$ is outputted from the output terminal of the operational amplifier 2120. Such example is merely for better understanding, and embodiments of the present disclosure are not limited thereto.

In practice, the first hardware element 201 and the second hardware 202 may have a similar structure (except sensitivity to deformation of the deformable portion 11, as discussed herein later), which, for example, favors fabrication (e.g. the hardware elements fabricated from in a same process or similar processes) of the sensor 21 or the apparatus 20. In such case, the first property and the second property may be of a same type. As an example, both the first property and the second property are resistance, or both the first property and the second property are capacitance.

In one embodiment, the first arm and the second arm are adjacent arms in the Wheatstone-bridge circuit 211. With the target range, both a gradient of the first property with respect to the temperature and a gradient of the second property with respect to the temperature are positive, or both a gradient of the first property with respect to the temperature and a gradient of the second property with respect to the temperature are negative.

Figure 10A:
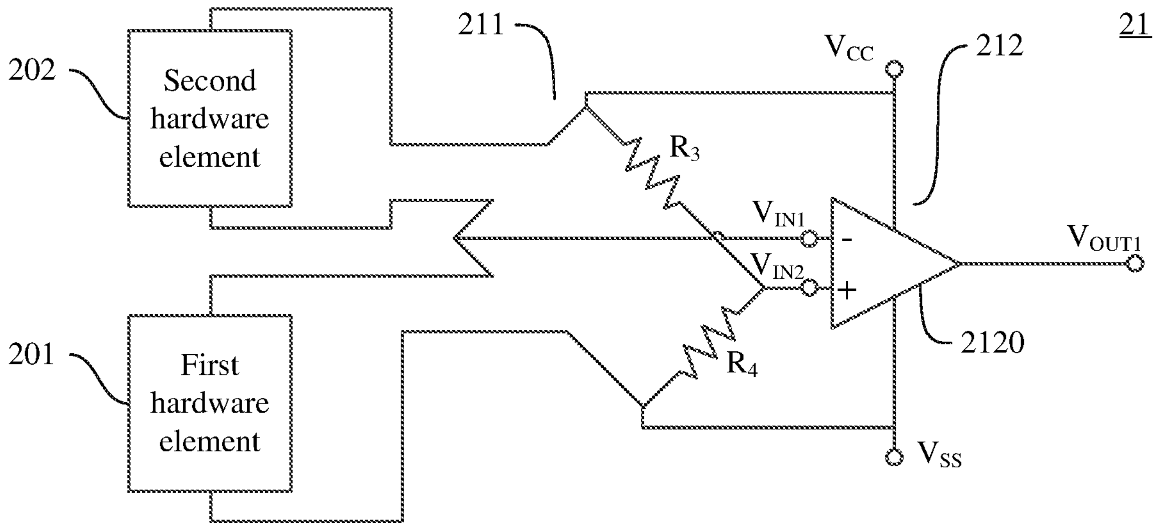
FIGS. 10*a* to 10*c* are schematic structural diagrams of a sensor according to various embodiments of the present disclosure.

Reference is made to FIG. 10*a*, which is a schematic structural diagram of sensor. In FIG. 10*a*, a common node between the first arm and the second arm is an output terminal of the Wheatstone-bridge circuit 211. It is assumed that the first property and the second property are resistance $R_1$ of the first hardware element 201 and resistance $R_2$ of the second hardware element 202, respectively, and resistance of the other two arms are $R_3$ and $R_4$, respectively. In such case, the first signal $V_{OUT1}$ may be expressed as follows.

$$V_{OUT1} = A\cdot(V_{IN1}-V_{IN2}) = A\left(\frac{R_4}{R_3+R_4}-\frac{R_1}{R_1+R_2}\right)(V_{CC}-V_{SS}) \tag{1}$$

A is a gain of the operational amplifier 2120. $V_{CC}$ and $V_{SS}$ are two voltages at the power terminals. The first change $\delta_1$ and the second change $\delta_2$ may be expressed as follows.

$$\delta_1 = \frac{dV_{OUT1}}{dR_1}\cdot\frac{dR_1}{dT} = -R_2\cdot\frac{dR_1}{dT}\cdot\frac{A(V_{CC}-V_{SS})}{(R_1+R_2)^2} \tag{2}$$

-continued $$\delta_2 = \frac{dV_{OUT1}}{dR_2}\cdot\frac{dR_2}{dT} = R_1\cdot\frac{dR_2}{dT}\cdot\frac{A(V_{CC}-V_{SS})}{(R_1+R_2)^2} \tag{3}$$

Thereby, compensation of the second change &> for the first change $\delta_1$ may be expressed as follows.

$$\delta_1+\delta_2 = \left(R_1\cdot\frac{dR_2}{dT}-R_2\cdot\frac{dR_1}{dT}\right)\cdot\frac{A(V_{CC}-V_{SS})}{(R_1+R_2)^2} \tag{4}$$

As discussed in the foregoing embodiments, the compensation requires$|\delta_1+\delta_2|<|\delta_1|$, namely, $\delta_1\cdot\delta_2<0$ and $|\delta_2|<2|\delta_1|$. Since $R_1$ and $R_2$ are generally positive, the requirement based on equation (4) may be expressed as $dR_1/dT\cdot dR_2/dT>0$ and $R_1\cdot|dR_2/dT<2R_2\cdot|dR_1/dT|$. Both $dR_1/dT$ and $dR_2/dT$ are positive, or both $dR_1/dT$ and $dR_2/dT$ are negative. Magnitude of a ratio of $dR_2/dT$ to $dR_1/dT$ is smaller than two times a ratio of $R_2$ to $R_1$.

The aforementioned definition of $TCR\cdot dT=dR/R$ may be taken into consideration. In a case that both the first hardware element 201 and the second hardware element 202 are of the resistor type, the compensation is achieved when $TCR_1\cdot TCR_2>0$ and $|TCR_2|<2|TCR_1|$. $TCR_1$ and $TCR_2$ represent temperature coefficients of resistance of the first hardware element 201 and the second hardware element 202, respectively. It is noted that the complete compensation is achieved when $TCR_2=TCR_1$, and the under compensation and over compensation are achieve when$|TCR_2|<|TCR_1|$ and $|TCR_1|<|TCR_2|<2|TCR_1|$, respectively. These relationships indicate that the compensation is mainly dominated by the TCRs rather than the resistance of the hardware elements within the target range. For example, in case of $TCR_1$ being 0.4%/K, $TCR_2$ is equal to or substantially equal to 0.4% K to achieve the compensation.

Figure 10B:
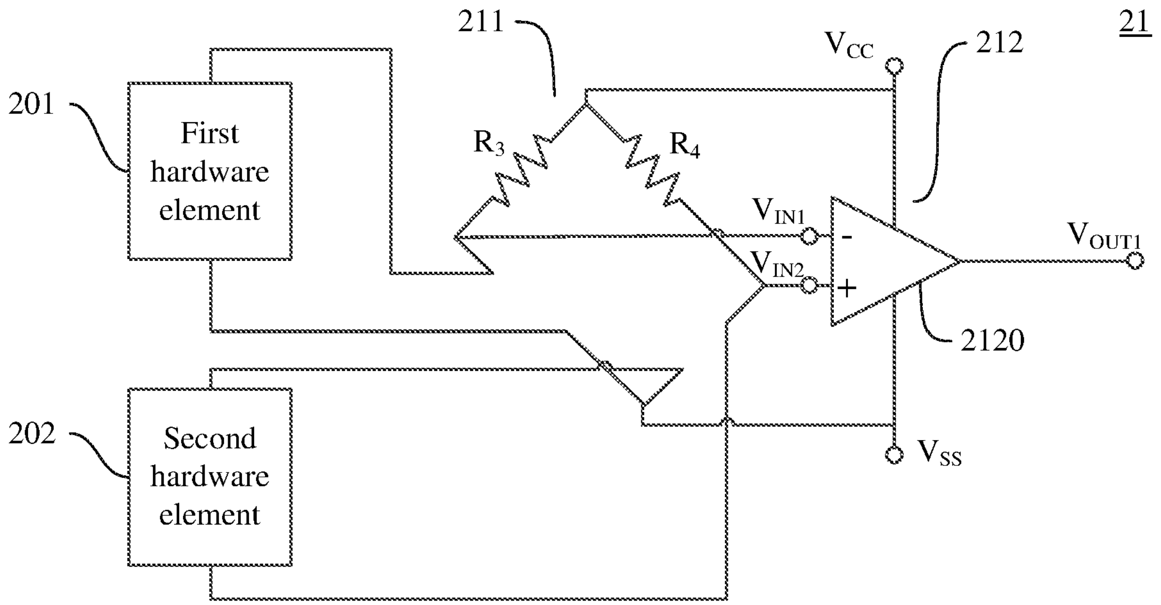

FIG. 10*a* shows an exemplary case where the adjacent first and second arms share a common node serving as an output terminal ($V_{IN2}$ in FIG. 10*a*), and it is also feasible that the shared common node serving as a power terminal. Reference is made to FIG. 10*b*, which is another schematic structural diagram of sensor. In FIG. 10*b*, the shared terminal is connected to a power-supply node $V_{SS}$. Still, it is assumed that the first property and the second property are resistance $R_1$ of the first hardware element 201 and resistance $R_2$ of the second hardware element 202, respectively, and resistance of the other two arms are $R_3$ and $R_4$, respectively. In such case, the first signal $V_{OUT1}$ may be expressed as follows.

$$V_{OUT1} = A\cdot(V_{IN1}-V_{IN2}) = A\left(\frac{R_2}{R_2+R_4}-\frac{R_1}{R_3+R_1}\right)(V_{CC}-V_{SS}) \tag{5}$$

Similar to equations (2) to (4), compensation of the second change $\delta_2$ for the first change $\delta_1$ may be expressed as follows.

$$\delta_1+\delta_2 = \left(\frac{R_4}{(R_2+R_4)^2}\cdot\frac{dR_2}{dT}-\frac{R_3}{(R_1+R_3)^2}\cdot\frac{dR_1}{dT}\right)\cdot A(V_{CC}-V_{SS}) \tag{6}$$

Since $R_1$, $R_2$, $R_3$, and $R_4$ are generally positive, the requirement of the compensation based on equation (6) may be expressed as $dR_1/dT\cdot dR_2/dT>0$ and $R_4\ (R_1+R_3)^2\cdot|dR_2/dT|<2R_3(R_2+R_4)^2\cdot|dR_1/dT|$. Similar to the case as shown in FIG. 10*a*, both $dR_1/dT$ and $dR_2/dT$ are positive, or both $dR_1/dT$ and $dR_2/dT$ are negative. Magnitude of a ratio of $dR_2/dT$ to $dR_1/dT$ is smaller than two times a ratio of $R_3(R_2+R_4)^2$ to $R_4(R_1+R_3)^2$.

Again, the aforementioned definition of $TCR \cdot dT = dR/R$ may be taken into consideration. In a case that both the first hardware element 201 and the second hardware element 202 are of the resistor type, complete compensation is achieved when $TCR_1 \cdot TCR_2 > 0$ and $$\left|\frac{TCR_2}{TCR_1}\right| < 2\frac{R_2R_3}{R_1R_4} \cdot \frac{(R_2+R_4)^2}{(R_1+R_3)^2}.$$

$TCR_1$ and $TCR_2$ represent temperature coefficients of resistance of the first hardware element 201 and the second hardware element 202, respectively. In practice, the Wheatstone-bridge circuit 211 may be configured with $R_1=R_2$ and $R_3=R_4$ for simplicity. In such case, apparently, the complete compensation is achieved when $TCR_1=TCR_2$, and over compensation are achieve when $|TCR_2|<|TCR_1|$ and $|TCR_1|<|TCR_2|<2|TCR_1|$, respectively, as described hereinabove in relation to FIG. 10*a*.

Other cases in which the first arm and the second arm are adjacent can be obtained analogously based on the above two embodiments as shown in FIGS. 10*a* and 10*b*. Such cases are, for example, the first arm and the second arm sharing a node connecting to $V_{IN1}$ or $V_{CC}$. Details may refer to the forgoing embodiments and are not repeated for conciseness and clarity.

In another embodiment, the first arm and the second arm are opposite arm is in the Wheatstone-bridge circuit 211. With the target range, one of a gradient of the first property with respect to the temperature and a gradient of the second property with respect to the temperature is positive, and another of the gradient of the first property with respect to the temperature and the gradient of the second property with respect to the temperature is negative.

Figure 10C:
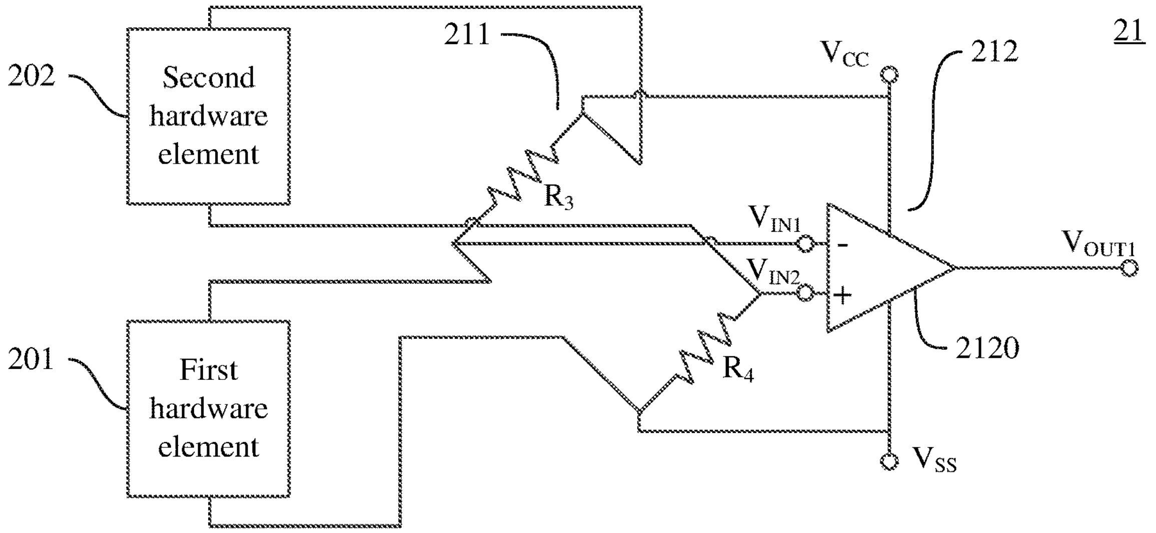

Reference is made to FIG. 10*c*, which is a schematic structural diagram of sensor. In FIG. 10*c*, the first arm is connected between the $V_{SS}$ and $V_{IN1}$, and the second arm is connected between $V_{CC}$ and $V_{IN2}$. Still, it is assumed that the first property and the second property are resistance $R_1$ of the first hardware element 201 and resistance $R_2$ of the second hardware element 202, respectively, and resistance of the other two arms are $R_3$ and $R_4$, respectively. In such case, the first signal $V_{OUT1}$ may be expressed as follows.

$$V_{OUT1} = A \cdot (V_{IN1} - V_{IN2}) = A\left(\frac{R_4}{R_2+R_4} - \frac{R_1}{R_1+R_3}\right)(V_{CC} - V_{SS}) \tag{7}$$

Similar to equations (2) to (4), compensation of the second change $\delta_1$ for the first change $\delta_1$ may be expressed as follows.

$$\delta_1 + \delta_2 = -\left(\frac{R_3}{(R_1+R_3)^2} \cdot \frac{dR_1}{dT} - \frac{R_4}{(R_2+R_4)^2} \cdot \frac{dR_2}{dT}\right) \cdot A(V_{CC} - V_{SS}) \tag{8}$$

Since $R_1$, $R_2$, $R_3$, and $R_4$ are generally positive, the requirement of the compensation based on equation (6) may be expressed as $dR_1/dT \cdot dR_2/dT < 0$ and $R_4(R_1+R_3)^2 \cdot |dR_2/dT| < 2R_3(R_2+R_4)^2 \cdot |dR_2/dT|$, $dR_1/dT$ is positive while $dR_2/dT$ is negative, or $dR_1/dT$ is negative or $dR_2/dT$ is positive. Magnitude of a ratio of $dR_2/dT$ to $dR_1/dT$ is smaller than two times a ratio of $R_3(R_2+R_4)^2$ to $R_4(R_1+R_3)^2$.

Again, the aforementioned definition of $TCR \cdot dT = dR/R$ may be taken into consideration. In a case that both the first hardware element 201 and the second hardware element 202 are of the resistor type, complete compensation is achieved when $TCR_1 \cdot TCR_2 < 0$ and $$\left|\frac{TCR_2}{TCR_1}\right| < 2\frac{R_2R_3}{R_1R_4} \cdot \frac{(R_2+R_4)^2}{(R_1+R_3)^2}.$$

$TCR_1$ and $TCR_2$ represent temperature coefficients of resistance of the first hardware element 201 and the second hardware element 202, respectively. In practice, the Wheatstone-bridge circuit 211 may be configured with $R_1=R_2$ and $R_3=R_4$ for simplicity. In such case, apparently, the complete compensation is achieved when $TCR_1=-TCR_2$, and over compensation are achieve when $|TCR_2|<|TCR|$ and $|TCR_1|<|TCR_2|<2|TCR_1|$, respectively. As an example, in case of $TCR_1$ being 0.4%/K, $TCR_2$ is equal to or substantially equal to −0.4%/K.

Other cases in which the first arm and the second arm are opposite arms can be obtained analogously based on the above embodiment as shown in FIG. 10*c*. As an example, the first arm is connected between $V_{SS}$ and $V_{IN2}$, while the second arm is connected between $V_{CC}$ and $V_{IN1}$. As another example, the first arm is connected between $V_{CC}$ and $V_{IN1}$, while the second arm is connected between $V_{SS}$ and $V_{IN2}$. Details may refer to the forgoing embodiment and are not repeated for conciseness and clarity.

Although the first property and the second property in the foregoing embodiments as shown in FIGS. 10*a* to 10*c* are resistance, it is appreciated that they may alternatively be capacitance. In such case, another arm in the Wheatstone-bridge circuit 211 should include a capacitor instead of a resistor in case of being connected in series with the capacitance between $V_{CC}$ and $V_{SS}$. Hereinafter two examples are provided to illustrate that a correspondence between the gradient relationship between the first and second properties and the connection relationship between the first and second arms according to the foregoing embodiments also bolds for the capacitance cases. Those skilled in the art could derive other capacitance cases from the forgoing embodiments by analogy based on the two following examples.

As an example, the first element 201 and the second element 202 in FIG. 10*a* may have capacitance $C_1$ and $C_2$, respectively. In such case, equation (5) is rewritten as follows.

$$V_{OUT1} = A \cdot (V_{IN1} - V_{IN2}) = A\left(\frac{R_4}{R_3+R_4} - \frac{C_2}{C_1+C_2}\right)(V_{CC} - V_{SS}) \tag{9}$$

Corresponding compensation of the second change $\delta_2$ for the first change of may be expressed as follows.

$$\delta_1 + \delta_2 = \left(C_2 \cdot \frac{dC_1}{dT} - C_1 \cdot \frac{C_2}{dT}\right) \cdot \frac{A(V_{CC} - V_{SS})}{(C_1+C_2)^2} \tag{10}$$

Since $C_1$ and $C_2$ are generally positive, the requirement based on equation (10) may be expressed as $dC_1/dT \cdot dC_2/$ dT>0 and $C_1 \cdot |dC_2/dT| < 2C_2 \cdot |dC_1/dT|$. Namely, both $dC_1/dT$ and $dC_2/dT$ are positive, or both $dC_1/dT$ and $dC_2/dT$ are negative. In a case that both the first hardware element 201 and the second hardware element 202 are of the capacitor type, complete compensation is achieved when $TCC_1 = TCC_2$, and the under compensation and over compensation are achieve when$|TCC_2| < |TCC_1|$ and $|TCC_1| < TCC_2 | < 2|TCC_1|$, respectively, when taking the definition of TCC dT=dC/C taken into consideration.

As another example, in FIG. 10*c*, the first element 201 and the second element 202 may have capacitance $C_1$ and $C_2$, respectively, and the resistors $R_3$ and $R_4$ are replaced with capacitors $C_3$ and $C_4$, respectively. In such case, equation (7) is rewritten as follows.

$$V_{OUT1} = A \cdot (V_{IN1} - V_{IN2}) = A\left(\frac{C_2}{C_2 + C_4} - \frac{C_3}{C_1 + C_3}\right)(V_{CC} - V_{SS}) \tag{11}$$

Corresponding compensation of the second change & for the first change of may be expressed as follows.

$$\delta_1 + \delta_2 = \left(\frac{C_3}{(C_1 + C_3)^2} \cdot \frac{dC_1}{dT} + \frac{C_4}{(C_2 + C_4)^2} \cdot \frac{dC_2}{dT}\right) \cdot A(V_{CC} - V_{SS}) \tag{12}$$

Since $C_1$, $C_2$, $C_3$, and $C_4$ are generally positive, the requirement based on equation (10) may be expressed as $dC_1/dT \cdot dC_2/dT < 0$ and $C_4(C_1+C_3)^2 \cdot |dC_2/dT| < 2C_3 (C_2+C_4)^2 \cdot |dC_1/dT|$, $dC_1/dT$ is positive while $dC_2/dT$ is negative, or $dC_1/dT$ is negative or $dC_2/dT$ is positive. Magnitude of a ratio of $dC_2/dT$ to $dC_1/dT$ is smaller than two times a ratio of $C_3(C_2+C_4)^2$ to $C_4(C_1+C_3)^2$. In a case that both the first hardware element 201 and the second hardware element 202 are of the resistor type, complete compensation is achieved $TCR_1 \cdot TCR_2 < 0$ and $$\left|\frac{TCR_2}{TCR_1}\right| < 2\frac{R_2 R_3}{R_1 R_4} \cdot \frac{(R_2 + R_4)^2}{(R_1 + R_3)^2}.$$

$TCR_1$ and $TCR_2$ represent temperature coefficients of resistance of the first hardware element 201 and the second hardware element 202, respectively. In practice, the Wheatstone-bridge circuit 211 may be configured with $C_1=C_2$ and $C_3=C_4$ for simplicity. In such case, apparently, the complete compensation is achieved when $TCC_1=-TCC_2$, and the under compensation and over compensation are achieve when$|TCC_2|<|TCC_1|$ and $|TCC_1|<|TCC_2|<2|TCC_1|$, respectively, when taking the definition of $TCC \cdot dT = dC/C$ taken into consideration.

As mentioned above, the first property and the second property may be of a same type due to similar structures of the first hardware element 201 and the second hardware 202. As an alternative, the first property and the second property may be different types, especially when the second hardware element could reuse an existing element in the apparatus 20, or could be conveniently fabricated along with an existing element in the apparatus 20. For example, one of the first property and the second property is resistance, while the other is capacitance.

In one embodiment, the first arm and the second arm are adjacent arms in the Wheatstone-bridge circuit 211. With the target range, one of a gradient of the first property with respect to the temperature and a gradient of the second property with respect to the temperature is positive, and another of the gradient of the first property with respect to the temperature and the gradient of the second property with respect to the temperature is negative.

Since the first property and the second property are of different types, it is not suitable to connect the first hardware element 201 and the second hardware element 202 in series between $V_{CC}$ and $V_{SS}$ (e.g. as shown in FIG. 10*a*). Reference is made to FIG. 10*b*. It is assumed that the first property is resistance $R_1$ of the first hardware element 201 and the second property is capacitance $C_2$ of the second hardware element 202. Further, the structure in FIG. 10*b* is modified by replacing the arm with the resistance $R_4$ with an arm with resistance $C_4$ (e.g. implemented with a capacitor), so as to provide an appropriate serial connection with the second arm. In such case, the first signal $V_{OUT1}$ may be expressed as follows.

$$V_{OUT1} = A \cdot (V_{IN1} - V_{IN2}) = A\left(\frac{C_4}{C_2 + C_4} - \frac{R_1}{R_3 + R_1}\right)(V_{CC} - V_{SS}) \tag{13}$$

Corresponding compensation of the second change 62 for the first change or may be expressed as follows.

$$\delta_1 + \delta_2 = -\left(\frac{C_4}{(C_2 + C_4)^2} \cdot \frac{dC_2}{dT} + \frac{R_3}{(R_1 + R_3)^2} \cdot \frac{dR_1}{dT}\right) \cdot A(V_{CC} - V_{SS}) \tag{14}$$

Since $R_1$, $C_2$, $R_3$, and $C_4$ are generally positive, the requirement of the compensation based on equation (14) may be expressed as $dR_1/dT \cdot dC_2/dT < 0$ and $C_4(R_1+R_3)^2 \cdot |dC_2/dT| < 2R_3(C_2+C_4)^2 \cdot |dR_2/dT/$. $dR_1/dT$ is positive while $dC_2/dT$ is negative, or $dR_1/dT$ is negative or $dC_2/dT$ is positive. Magnitude of a ratio of $dC_2/dT$ to $dR_1/dT$ is smaller than two times a ratio of $R_1(C_2+C_4)^2$ to $C_4(R_1+R_3)^2$.

Other cases in which the first arm and the second arm are adjacent can be obtained analogously based on this embodiment. Such cases are, for example, the first arm and the second arm sharing a node connecting to $V_{CC}$, or the first property is capacitance while the second property of resistance. Details may refer to the forgoing embodiments and are not repeated for conciseness and clarity.

In one embodiment, the first arm and the second arm are opposite arms in the Wheatstone-bridge circuit 211. With the target range, both a gradient of the first property with respect to the temperature and a gradient of the second property with respect to the temperature are positive, or both a gradient of the first property with respect to the temperature and a gradient of the second property with respect to the temperature are negative.

Reference is made to FIG. 10*c*. Similarly, it is assumed that the first property is resistance $R_1$ of the first hardware element 201 and the second property is capacitance $C_2$ of the second hardware element 202. Further, the structure in FIG. 10*c* is modified by replacing the arm with the resistance $R_4$ with an arm with resistance $C_4$ (e.g. implemented with a capacitor), so as to provide an appropriate serial connection with the second arm. In such case, the first signal $V_{OUT1}$ may be expressed as follows.

$$V_{OUT1} = A \cdot (V_{IN1} - V_{IN2}) = A\left(\frac{C_2}{C_2 + C_4} - \frac{R_1}{R_3 + R_1}\right)(V_{CC} - V_{SS}) \tag{15}$$

Corresponding compensation of the second change $\delta_2$ for the first change $\delta_1$ may be expressed as follows.

$$\delta_1+\delta_2=-\left(\frac{C_4}{(C_2+C_4)^2}\cdot\frac{dC_2}{dT}+\frac{R_3}{(R_1+R_3)^2}\cdot\frac{dR_1}{dT}\right)\cdot A(V_{CC}-V_{SS}) \tag{16}$$

Since $R_1$, $C_2$, $R_3$, and $C_4$ are generally positive, the requirement of the compensation based on equation (14) may be expressed as $dR_1/dT\cdot dC_2/dT>0$ and $C_4(R_1+R_3)^2\cdot|dC_2/dT|<2R_3(C_2+C_4)^2\cdot|dR_2/dT|$. Both $dR_1/dT$ and $dC_2/dT$ are negative, or both $dR_1/dT$ and $dC_2/dT$ are positive. Magnitude of a ratio of $dC_2/dT$ to $dR_1/dT$ is smaller than two times a ratio of $R_3(C_2+C_4)^2$ to $C_4(R_1+R_3)^2$.

Other cases in which the first arm and the second arm are opposite arms can be obtained analogously based on this embodiment. As an example, the first arm is connected between $V_{SS}$ and $V_{IN2}$, while the second arm is connected between $V_{CC}$ and $V_{IN1}$. As another example, the first arm is connected between $V_{CC}$ and Vii, while the second arm is connected between $V_{SS}$ and $V_{IN2}$. As still another example, the first property is capacitance, while the second property of resistance. Details may refer to the forgoing embodiment and are not repeated for conciseness and clarity.

Those skilled in the art can appreciate that topologies, in FIGS. 10*a* to 10*c*, of the Wheatstone-bridge circuit 211 and the amplifier circuit 212 are merely exemplary, and other variants of the topologies may be obtained without creative efforts. For example, any resistor in the Wheatstone-bridge circuit 211 may be replaced by any quantity of resistors connected in series, parallel, or a combination of the two. Similarly, any capacitor in the Wheatstone-bridge circuit 211 may be replaced by any quantity of capacitors connected in series, parallel, or a combination of the two. For another example, the operational amplifier 2120 may be connected in a closed-loop mode, a negative-feedback mode, a low-pass filter mode, or an integrator-circuit mode, instead of the depicted open-loop mode, as long as the output signal from the Wheatstone-bridge circuit 211 can be amplified. Further, the connection between the two output terminals of the Wheatstone-bridge circuit 211 and the two input terminals of the operational amplifier 2120 may be switched, namely, the signal $V_{IN1}$ is inputted into the non-inverting input terminal while the signal $V_{IN2}$ is inputted into the inverting input terminal. It is further appreciated that the Wheatstone-bridge circuit may be replaced by another appropriate circuit according to a practical situation, as long as the hardware elements are incorporated therein, and the first property and the second property interacts with the temperature T and the first signal $V_{OUT1}$ in a similar manner.

Figure 11A:
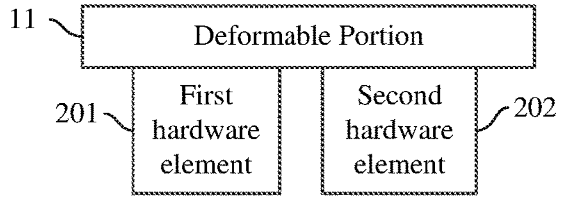
FIGS. 11*a* to 11*d* are cross-sectional views of a first hardware element and a second hardware element that are attached to a deformable portion according to various embodiments of the present disclosure.
Figure 11B:
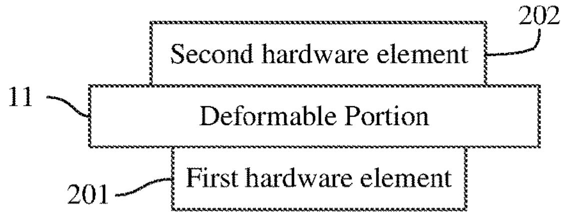

The first hardware element 201 and the second hardware element 202 may be arranged in various manners with respect to the deformable portion 11. In one embodiment, the first hardware element 201 and the second hardware element 202 are attached to different locations of the deformable portion. As an example, the first hardware element 201 and the second hardware element 202 are attached to a same side of the deformable portion, as shown in FIG. 11*a*. The first hardware element 201 and the second hardware element 202 are disposed close to each other to ensure a substantially synchronous change in temperature. Moreover, as shown in FIG. 11*a*, the first hardware element 201 and the second hardware element 202 may be separated from each other by a gap for insulation, especially when the first property and the second property are both electrical properties. The gap may be filled with air or other electrical insulating materials (not shown). As another example, the first hardware element 201 and the second hardware element 202 are attached to different sides of the deformable portion, as shown in FIG. 11*b*. Across the deformable portion, the first hardware element 201 and the second hardware element 202 may be aligned with or close to each other in positions, to ensure a substantially synchronous change in temperature. In such case, the deformable portion 11 serves as an electrical insulation between the first hardware element 201 and the second hardware element 202.

Figure 11C:
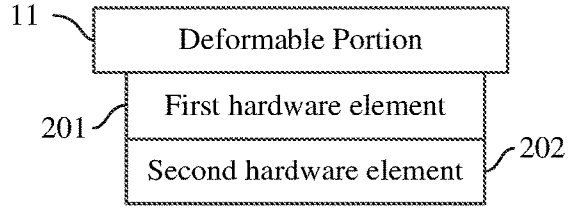
Figure 11D:
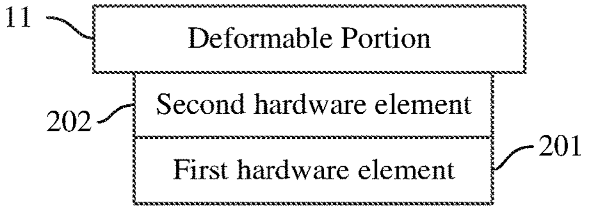

In an alternative embodiment, the first hardware element 201 and the second hardware element 202 are attached to a same position of the deformable portion, but one via another. As an example, the first hardware element 201 is attached to the deformable region 11 via the second hardware element 202, as shown in FIG. 11*c*. As another example, the second hardware element 202 is attached to the deformable region 11 via the second hardware element 201, as shown in FIG. 11*d*. In a case that the first property and the second property are both electrical properties, an electrical insulating material (not shown) such as an insulating film is disposed between the first element hardware 201 and the second element hardware 202.

Moreover, it is desired that the sensitivity of the first hardware 201 to the deformation of the deformable portion is not weakened by the second hardware element 202. Therefore, in some embodiments, the second hardware element 202 is such configured that the second property is not sensitive to the deformation of the deformable portion 11. It is appreciated that the present disclosure is not limited thereto. In some embodiments, the second property has a dependency moo on the deformation of the deformable portion 11, and such dependency would induce a change ow that strengthens the target change do into the first signal $V_{OUT1}$, that is $|\delta_\omega+\delta_0|>|\delta_0|$. As an example on a basis of FIG. 8*a*, both the first hardware element 201 and the second hardware element 202 may be strain gauges with aligned sensing directions, of which one is positive while another is negative in TCR.

Figure 12:
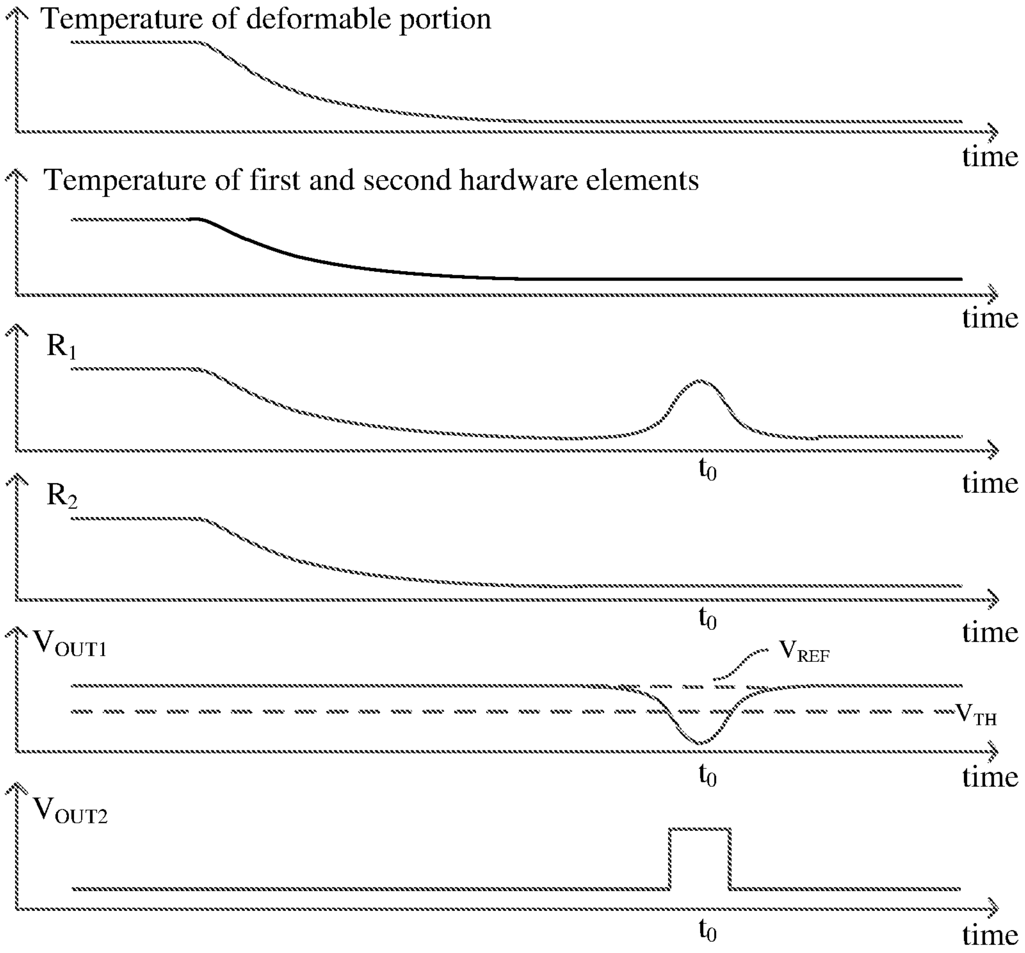
FIG. 12 is a schematic graph of a change in signals with respect to a force and temperature of a deformable portion according to an embodiment of the present disclosure.

Reference is made to FIG. 12, which is a schematic graph of a change in signals with respect to a force and temperature of a deformable portion according to an embodiment of the present disclosure. As an example, it is assumed that the sensor 21 adopts a structure as shown in any one of FIGS. 10*a* and 10*b*, to facilitation illustration and comparison with the structure as shown in FIG. 3. It is further assumed that $TCR_1$ and $TCR_2$ are equal and positive, and $R_3$ is equal to $R_4$. It can be seen from FIG. 12 that both the temperature of the first hardware element 201 and the second hardware element 202 decreases with the temperature of the deformable portion 11. Correspondingly, the resistance of the first hardware element 201 and the second hardware element 202 both decreases by a same degree. In the structure as shown in FIG. 10*a*, since the first arm and the second arm are connected in series between $V_{CC}$ and $V_{SS}$, the voltages across the first arm and the second arm would stay the same, and thereby the inverting input signal $V_{IN1}$ of the first operational amplifier 2120 is kept constant. In the structure as shown in FIG. 10*b*, since $R_3$ and $R_2$ are constant, the voltages across the first arm and the second arm would decrease by a same degree, and thereby a difference between the inverting input signals $V_{IN1}$ and Vine of the first operational amplifier 2120 is kept constant. In either case, the decreased temperature would not influence the first output signal $V_{OUT1}$, and hence the reference signal $V_{REF}$ is maintained at a fixed level. That is, a difference between the reference signal $V_{REF}$ and the threshold signal $V_{TH}$ is kept constant. At the moment to, the first signal $V_{OUT1}$ dipping from the reference signal $V_{REF}$ is capable to reach the threshold signal $V_{TH}$, just as what should happen without the decrease of the temperature of the deformable portion 11. A bottom of the valley in the first signal $V_{OUT1}$ is lower than the threshold signal $V_{TH}$. Accordingly, the comparator 22 turns the second signal $V_{OUT2}$ into the active state, the hardware module 12 is informed of the deformation of the deformable portion, and the electronic device 10 is capable to recognize the deformation around the moment to and gives a proper response.

A similar case for FIG. 10*e* can be obtained by analogy based on the above description on FIG. 10*b*. Assuming $TCR_1=-TCR_2$ and $TCR_2$ being negative, a difference from FIG. 12 only lies in that the resistance of the second hardware element 202 increases, instead of decrease, with the decreasing temperature of the deformable portion 11. For conciseness and clarity, details are not described herein.

Figure 13:
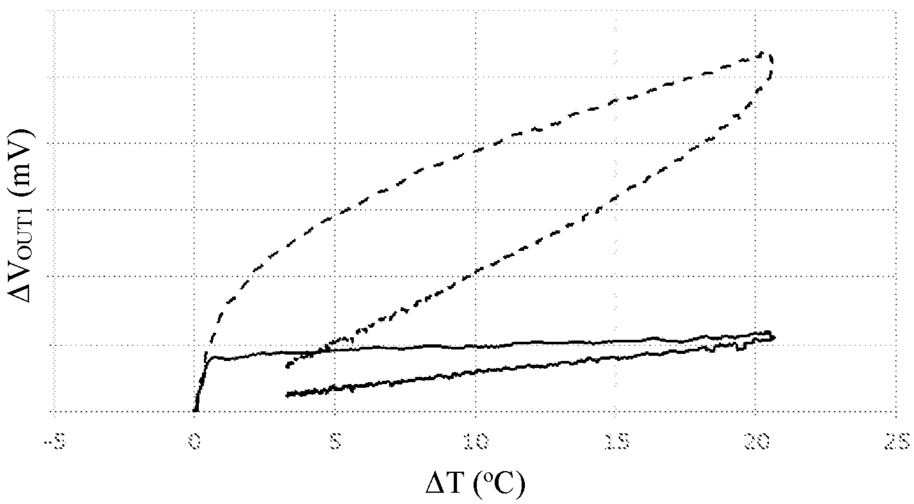
FIG. 13 is a schematic graph of a first signal with respect to a change of temperature according to an embodiment of the present disclosure.

It is appreciated that the structure as shown in FIGS. 8*a* and 8*b* may also be utilized in a sensor including the Wheatstone bridge circuit. In such case, the structure shown in FIG. 9*a* or 9*b* is incorporated into one arm of the Wheatstone bridge circuit. The other three arms of the Wheatstone bridge circuit may be provided resistance or capacitance insensitive to the temperature of the deformable portion 11. Reference is made to FIG. 13, which shows an effect of temperature compensation using a practical example structure which is based on that as shown in FIG. 8*a*. A change in the first signal $V_{OUT1}$ is depicted against a change in temperature, which increases from 0° C., to around 21° C., and then decreases to around 3° C. The solid line and the dashed line represent data from the practical structure and a reference structure, respectively. The reference structure has a conventional structure utilizing a Wheatstone bridge circuit, in which the first hardware element 201 is incorporated into an arm and there is no second hardware element 202. The example structure differs from the reference structure in that the second hardware element 202 is connected in series with the first hardware element 201 in such arm. As seen from FIG. 8*a*, the temperature drift of the first signal $V_{OUT1}$ in the example structure is merely one fifth of that in the reference structure. Namely, the first signal $V_{OUT1}$ is greatly stabilized when the second hardware element 202 is added.

It is further appreciated that the structures as shown in FIGS. 9*a* and 9*b* may coordinate with the structures as shown in FIGS. 10*a* to 10*c*. In such case, the sensor 21 includes multiple second hardware elements 202. One of the second hardware elements 202 may be arranged in a same arm with the first hardware elements 201, while another or more of the second hardware elements 202 are arranged in the other three arms. An overall change induced by second properties of all second hardware elements 202 compensates for the first change induced by the first property of the first hardware element 201.

Hereinafter further introduced are some embodiments corresponding to the process as shown in FIG. 8*b*, i.e. the first property depends on the second property.

Similar to the foregoing embodiments, the first property may still be an electrical property, so as to facilitate the sensor 21 to detect the first property and convert the first property into the first signal $V_{OUT1}$. In one embodiment, the first property is resistance or capacitance of the first hardware element 201.

As shown in FIG. 9*b*, since the second property may have an indirect influence on the first signal $V_{OUT1}$ via the first property, the second property may be embodied as a type other than the electrical property, such as a physical property. In some embodiments, the second property is a dimension of the second hardware element 202. The dimension may include at least one of a length, a width, a thickness, a curvature, or a torsional angle of the hardware element 202.

Figure 14:
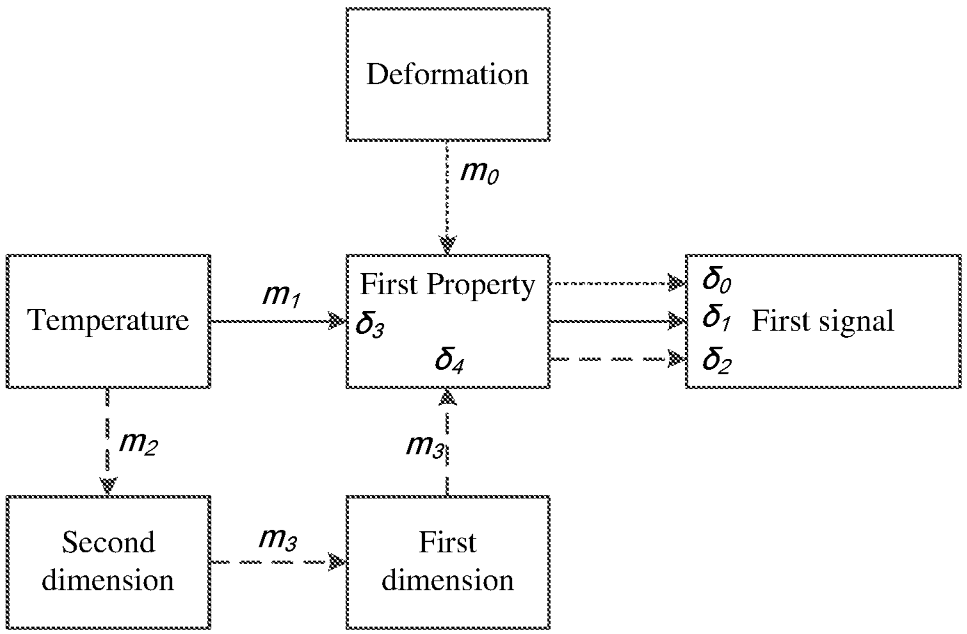
FIG. 14 is a schematic diagram of another temperature compensation process of an apparatus for force sensing according to an embodiment of the present disclosure.

In one embodiment, the first hardware element 201 is attached to the second hardware element 202, and a first dimension ha of the first hardware element 201 along a first direction changes in response to a second dimension $h_2$ of the second hardware element 202 along the first direction being changed. The second dimension $h_2$ serves as the second property. Within the target range, a third change $\delta_3$ induced into the first property by the first dimension compensates for a fourth change $\delta_4$ induced into the first property by the temperature. Reference is made to FIG. 14, which is schematic diagram of another temperature compensation process of an apparatus for force sensing according to an embodiment of the present disclosure. The temperature compensation process in FIG. 14 is basically same as that in FIG. 8*b*, except that the dependency ma is specifically illustrated as two parts. A first part is a dependency of the first property on the first dimension $h_1$, and a second part is a dependency of the first dimension $h_1$ on the second dimension $h_2$ (i.e. the second property). The third change $\delta_3$ and the fourth change $\delta_4$ may be expressed as follows.

$$\delta_3 = \frac{dP}{dT} \tag{17}$$

$$\delta_4 = \frac{dP}{dh_1} \cdot \frac{dh_1}{dh_2} \cdot \frac{dh_2}{dT} \tag{18}$$

In equations (17) and (18), P represents the first property (e.g. resistance or capacitance of the first hardware element 201) and is a function of the first dimension and the temperature, namely. $P(h_1T)$, $dh_2/dT$ is a thermal expansion coefficient of the second hardware element 202, dP/dT refers to a gradient of the first property with respect to the temperature of the deformable portion 11, and may be a temperature coefficient of the first property (e.g. TCR or TCC of the first hardware element 201). As described above in relation to FIG. 8*b*, the compensation with respect to changes brought by the temperature not only takes place in the first signal $V_{OUT1}$ but also takes place in the first property, and a change (i.e. the fourth change $\delta s$) induced into the first property by the second property directly compensates for a change (i.e. the third change $\delta_3$) induced into the first property by the temperature. Similar to the aforementioned relationship between the first change $\delta_1$ and the second change $\delta_2$, the compensation can be expressed as $|\delta_3+\delta_4|<|\delta_3|$, or $\delta_3\cdot\delta_4<0$ and $|\delta_4|<2|\delta_3|$. Specifically, $\delta_3\cdot\delta_4<0$ means that one of the third change $\delta_4$ and the fourth change da may be positive, while the other is negative. The following condition is obtained by substituting the equations (17) and (18).

$$\frac{dP}{dT} \cdot \frac{dP}{dh_1} \cdot \frac{dh_1}{dh_2} \cdot \frac{dh_2}{dT} < 0 \tag{19}$$

Hence, among the four factors at the left of the condition (19), one should be negative while the other three should be positive, or one should be positive while the other three should be negative.

For example, the change of the first dimension $h_1$ in response to the change of the second dimension $h_2$ may result from the attachment between the first hardware element 201 and the second hardware element 202.

Figure 15A:
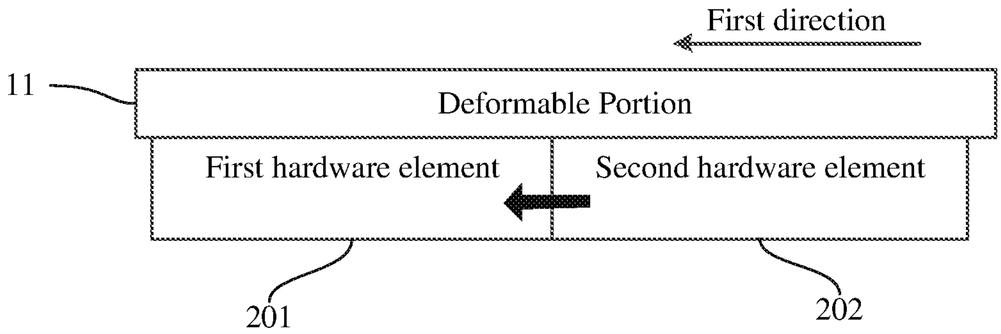
FIGS. 15*a* and 15*b* are cross-sectional views of a first hardware element and a second hardware element that are attached to a deformable portion according to other embodiments of the present disclosure.

In one embodiment, the first dimension h is increased in response to the second dimension h; being decreased. An example arrangement is as shown in FIG. 15*a*, where the first hardware element 201 and the second hardware element 202 abut against each other tightly along the first direction. As indicated by the arrow between the two hardware elements, expansion of one hardware element would result in compression of the other. In such case, since $dh_1/dh_2<0$, the condition (19) is rewritten as a following condition.

$$\frac{dP}{dT}\cdot\frac{dP}{dh_1}\cdot\frac{dh_2}{dT}>0 \tag{20}$$

The condition (20) means that among the thermal expansion coefficient of the second hardware element ($dh_2/dT$), a gradient of the first property with respect to the first dimension ($dP/dh_1$), and a gradient of the first property with respect to the temperature (dp/dT), there are two negative parameters and one positive parameter, or all the three parameters are positive. Generally, since a material with negative thermal expansion coefficient is rare, $dh_2/dT$ could be positive, and thus both $dP/dh_1$ and dP/dT are positive, or both $dP/dh_1$ and dP/dT are negative.

Figure 15B:
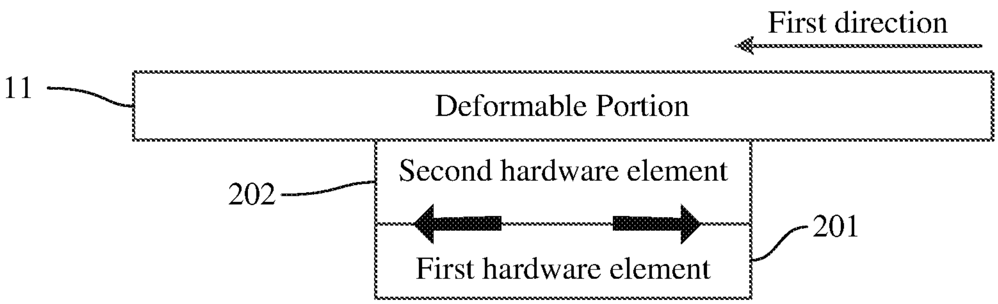

In one embodiment, the first dimension $h_1$ is increased in response to the second dimension ha being increased. An example arrangement is as shown in FIG. 15*b*, where a contact interface between the first hardware element 201 and the second hardware element 202 is parallel with the first direction. As indicated by the arrows between the two hardware elements, expansion of one hardware element would result in similar expansion of the other, and compression of one hardware element would result in similar compression of the other. In such case, since $dh_1/dh_2>0$, the condition (19) is rewritten as a following condition.

$$\frac{dP}{dT}\cdot\frac{dP}{dh_1}\cdot\frac{dh_2}{dT}<0 \tag{21}$$

The condition (21) means that among the thermal expansion coefficient of the second hardware element ($dh_2/dT$), a gradient of the first property with respect to the first dimension ($dP/dh_1$), and a gradient of the first property with respect to the temperature (dP/dT), there are two positive parameters and one negative parameter, or all the three parameters are negative. Generally, since a material with negative thermal expansion coefficient is rare, $dh_2/dT$ could be positive, and thus one of $dP/dh_1$ and dP/dT is positive, and another of $dP/dh_1$ and dP/dT is negative.

In FIG. 15*b*, the first hardware element 201 is attached the deformable portion 11 via the second hardware element 202, such that the second hardware element 202 may further serve as a thermal buffer which reduces the influence of the temperature on the first property. In an alternative embodiment, the second hardware element 202 is attached to the deformable portion 11 via the first hardware element 201 (e.g. as shown in FIG. 11*e*), such that deformation of the deformable portion 11 would not be cushioned by the second hardware element 202, increasing sensitivity of the first hardware element 201 to the deformation.

Although FIGS. 15*a* and 15*b* show that the first hardware element 201 and the second hardware element 202 are attached each other, it is appreciated that an intermediate structure or material may be arranged between the two for transmitting the change in dimensions.

The above solutions corresponding to FIG. 8*b* is at least advantageous in that the compensation can be implement by adjusting $dh_2/dT$ and $dh_1/dh_2$ based on $dP/dh_1$ and dP/dT, namely, by selecting a proper material for the second hardware element 202 based on an existing first hardware element without changing electrical connections. Such adjustment may be implemented by tuning a ratio of one component in the material of the second hardware element 202, for example, a ratio of glass fiber in a polyamide-based thermal expansion sheet. In some embodiments, the second hardware element 202 serves as a part of the deformable portion. In such case, the attachment between the two hardware elements is directly implemented by the attachment between the first hardware element and the deformable portion. Thereby, no additional second hardware element is needed, and the temperature compensation can be implemented simply by tuning a proper material of the deformable portion 11.

Figure 16:
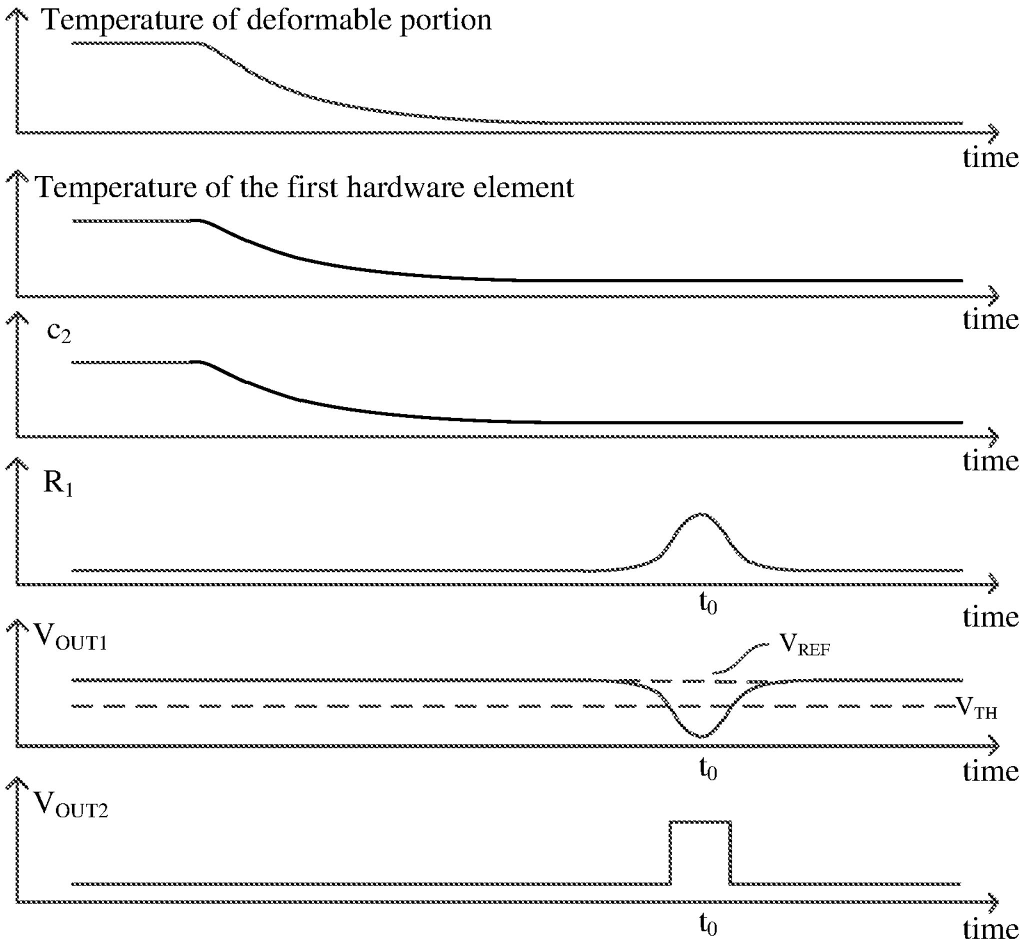
FIG. 16 is a schematic graph of change in signals with respect to a force and temperature of a deformable portion according to another embodiment of the present disclosure.

Reference is made to FIG. 16, which is another schematic graph of a change in signals with respect to a force and temperature of a deformable portion according to an embodiment of the present disclosure. In this embodiment, the arrangement as shown in FIG. 15*a* or 15*b* is applied to a conventional Wheatstone bridge circuit, in which the first hardware element 201 is connected into an arm, and the other three arms are constant resistors (insensitive to the temperature of the deformable portion 11). It is assumed that the first element hardware 201 is a strain gauge with a sensing direction aligned with the first direction, and the second hardware element 202 is a thermal expansion sheet attached to the strain gauge. The first hardware has a positive TCR in FIG. 15*a* or a negative TCR in FIG. 15*b*. It can be seen from FIG. 16 that when the temperature of the deformable portion 11 decreases, both the temperature of the first hardware element 201 and the second dimension $c_2$ decrease. For the arrangement in FIG. 15*a*, the decreased temperature tends to decrease the resistance $R_1$ of the strain gauge due to the positive TCR, while the decreased second dimension $c_2$ leads to an increased first dimension $c_1$ that tends to increase the resistance $R_2$ due to the structure of the strain gauge. For the arrangement in FIG. 15*b*, the decreased temperature tends to increase the resistance $R_1$ of the strain gauge due to the negative TCR, while the decreased second dimension $c_2$ leads to a decreased first dimension $c_1$ that tends to decrease the resistance $R_1$ due to the structure of the strain gauge. In either case, a change induced by the second dimension $c_2$ into the resistance $R_1$ may compensates for the change directly induced by the temperature T into the resistance $R_1$. Therefore, when the strain gauge and the thermal expansion sheet are properly configured, the resistance $R_1$ can be immune to the temperature variation, and hence the reference signal $V_{REF}$ is maintained at a fixed level. That is, a difference between the reference signal $V_{REF}$ and the threshold signal $V_{TH}$ is kept constant. Hence, the response as shown in FIG. 16 is quite similar to the ideal case as shown in FIG. 5. At the moment $t_0$, the first signal $V_{OUT1}$ dipping from the reference signal $V_{REF}$ is capable to reach the threshold signal $V_{TH}$, just as what should happen without the decrease of the temperature of the deformable portion 11. A bottom of the valley in the first signal $V_{OUT1}$ is lower than the threshold signal $V_{TH}$. Accordingly, the comparator 22 turns the second signal $V_{OUT2}$ into the active state, the hardware module 12 is informed of the deformation of the deformable portion, and the electronic device 10 is capable to recognize the deformation around the moment ta and gives a proper response.

FIGS. 12 and 16 illustrate an example that the threshold signal $V_{TH}$ is lower than the reference signal $V_{REF}$, the deformation induces a valley in the first signal $V_{OUT1}$, the temperature is subject to an decrease, and the compensation would prevent the comparator 22 from giving a “false negative” result when determining whether the deformable portion 11 deforms. Other embodiments may be obtained by analogy, which also falls within the scope of the present disclosure. For example, the threshold signal $V_{TH}$ is higher than the reference signal $V_{REF}$ and the deformation induces a peak in the second signal $V_{OUT2}$. For another example, the temperature is subject to an increase, and the compensation would prevent the comparator 22 from giving a “false positive” result when determining whether the deformable portion 11 deforms.

In some embodiments, the threshold signal $V_{TH}$ may include a set of signals, based on a quantity of degrees of the deformation that are to be recognized by the hardware model 12. For example, the threshold signal $V_{TH}$ may include one or more signals for compression, such that different degrees of compression (or squeezing input operations) can be recognized by the hardware model 12. Alternatively or additionally, the threshold signal $V_{TH}$ may include one or more signals for tension, such that different degrees of tension (or stretching input operations) can be recognized by the hardware model 12.

An electronic device is further provided according to embodiments of the present disclosure Reference is made to FIG. 7, where the electronic device 10 may include the aforementioned apparatus 20 for force sensing, the deformable region 11, and a hardware module 12. In FIG. 7, the hardware module 12 is configured to receive the second signal $V_{OUT2}$, and a state of the hardware module 12 changes in response to a state of the second signal $V_{OUT2}$ being changed. In one embodiment, the hardware module may be a controller, a processor, a display, a speaker, a switch, an indicator light, or the like. It is appreciated that the hardware module may be in other forms, as long as it can change a state thereof according to the second signal $V_{OUT2}$.

The electronic device 10 may include a mobile phone, a watch, glasses, a head-mounted display device, an earbud, a keyboard, a tablet, or the like. The apparatus 20 for force sensing may be configured based on a structure of the electronic device 10 in practice. For example, the electronic device 10 is an earbud, a housing of the earbud includes a deformable cap (an outer shell), and a user can operate the earbud by squeezing or pressing the deformable cap. In such case, the apparatus 20 for force sensing may be located inside or at a surface of the housing, and the first hardware element 201 of the sensor 21 is attached to an inner side or an outer side of the deformable cap. The comparator 22 may be integrated on one or more print circuit boards (PCBs) which are enclosed by the housing. For another example, the electronic device 10 is a foldable display device, a flexible display panel of the device is provided with a folding axis, and a user can switch on the device by opening the folded display panel. In such case, the apparatus 20 for force sensing may be located inside or at a surface of a foldable region of the display panel, and the first hardware element 201 of the sensor 21 is attached to an inner side or an outer side of the display screen at the foldable region. The comparator 22 may be integrated in one or more processors of the display device.

The embodiments of the present disclosure are described in a progressive manner, and each embodiment places emphasis on the difference from other embodiments. Therefore, one embodiment can refer to other embodiments for the same or similar parts. Since the methods disclosed in the embodiments correspond to the apparatuses disclosed in the embodiments, the description of the methods is simple, and reference may be made to the relevant part of the apparatuses.

According to the description of the disclosed embodiments, those skilled in the art can implement or use the present disclosure. Various modifications made to these embodiments may be obvious to those skilled in the art, and the general principle defined herein may be implemented in other embodiments without departing from the spirit or scope of the present disclosure. Therefore, the present disclosure is not limited to the embodiments described herein but confirms to a widest scope in accordance with principles and novel features disclosed in the present disclosure.

The invention claimed is:

1. An apparatus for sensing force, located in an electronic device or at a surface thereof, wherein the electronic device comprises a deformable portion, comprising:

a sensor, configured to generate a first signal, wherein the sensor comprises a first hardware element attached to the deformable portion, and the first signal depends on a first property of the first hardware element; and a second hardware element, wherein the first signal depends on a second property of the second hardware element;

wherein the first property has a dependency on deformation of the deformable portion, the second property has a dependency on temperature at the deformable portion, and the first property has another dependency on the temperature at the deformable portion in absence of the second hardware element;

wherein when the temperature at the deformable portion changes within a target range, a first change is induced into the first signal through the dependency of the first property on the temperature, and a second change is induced into the first signal through the dependency of the second property on the temperature; and wherein the second change compensates for the first change.

2. The apparatus according to claim 1, wherein:

the first hardware element and the second hardware element are attached to different locations of the deformable portion;

the first hardware element is attached to the deformable region via the second hardware element; or the second hardware element is attached to the deformable region via the first hardware element.

3. The apparatus according to claim 1, wherein:

the second property is not sensitive to the deformation of the deformable portion.

4. The apparatus according to claim 1, wherein the first property is resistance, and the first hardware element is a strain gauge, or the first hardware element comprises two contacts separated by a gap, and a contact resistance between the two contacts changes monotonously with a width of the gap.

5. An electronic device, comprising:

a deformable portion;

the apparatus according to claim 1, wherein the first hardware element of the apparatus is attached to the deformable portion; and a hardware module, configured to receive the first signal, wherein a state of the hardware module changes in response to a state of the first signal being changed.

6. The apparatus according to claim 1, wherein a magnitude of a sum of the first change and the second change is smaller than a magnitude of the first change.

7. The apparatus according to claim 6, wherein the first property is independent from the second property, and wherein the first property comprises a resistance of the first hardware element, the second property comprises a resistance of the second hardware element, and the first hardware element and the second hardware element are connected in series; or the first property comprises a capacitance of the first hardware element, the second property comprises a capacitance of the second hardware element, and the first hardware element and the second hardware element are connected in parallel.

8. The apparatus according to claim 7, wherein within the target range:

a first of a gradient of the first property with respect to the temperature and a gradient of the second property with respect to the temperature is positive, and a second of the gradient of the first property with respect to the temperature and the gradient of the second property with respect to the temperature is negative; and a magnitude of the gradient of the second property with respect to the temperature is smaller than two times magnitude of the gradient of the first property with respect to the temperature.

9. The apparatus according to claim 7, wherein within the target range, a product of the first property and a temperature coefficient of the first property is equal to a negative of a product of the second property and a temperature coefficient of the second property.

10. The apparatus according to claim 7, wherein:

the sensor comprises a Wheatstone-bridge circuit, a first arm of the Wheatstone-bridge circuit comprises the first hardware element, and a second arm of the Wheatstone-bridge circuit comprises the second hardware element.

11. The apparatus according to claim 10, wherein:

the first arm and the second arm are opposite arms in the Wheatstone-bridge circuit; and within the target range, a first of a gradient of the first property with respect to the temperature and a gradient of the second property with respect to the temperature is positive, and a second of the gradient of the first property with respect to the temperature and the gradient of the second property with respect to the temperature is negative.

12. The apparatus according to claim 10, wherein:

one of the first property and the second property is resistance, and the other of the first property and the second property is capacitance.

13. The apparatus according to claim 10, wherein:

the first arm and the second arm are adjacent arms in the Wheatstone-bridge circuit; and within the target range, a gradient of the first property with respect to the temperature and a gradient of the second property with respect to the temperature are both positive, or both negative.

14. The apparatus according to claim 13, wherein a common node between the first arm and the second arm serves as an output terminal of the Wheatstone-bridge circuit, and within the target range:

a temperature coefficient of the first property and a temperature coefficient of the second property are both positive, or both negative; and a magnitude of the temperature coefficient of the second property is smaller than magnitude of the temperature coefficient of the first property.

15. The apparatus according to claim 14, wherein:

the first arm and the second arm are adjacent arms in the Wheatstone-bridge circuit; and within the target range, one of a gradient of the first property with respect to the temperature and a gradient of the second property with respect to the temperature is positive, and the other of the gradient of the first property with respect to the temperature and the gradient of the second property with respect to the temperature is negative.

16. The apparatus according to claim 14, wherein:

the first arm and the second arm are opposite arms in the Wheatstone-bridge circuit; and within the target range, a gradient of the first property with respect to the temperature and a gradient of the second property with respect to the temperature are both positive, or both negative.

17. The apparatus according to claim 6, wherein the first property further depends on the second property, and, wherein the first property is resistance or capacitance of the first hardware element.

18. The apparatus according to claim 17, wherein;

the first hardware element is attached to the second hardware element;

a first dimension of the first hardware element along a first direction changes in response to a second dimension of the second hardware element along the first direction being changed;

the second property is the second dimension;

when the temperature at the deformable portion changes within the target range, a fourth change induced into the first property by the first dimension compensates for a third change induced into the first property by the temperature; and wherein magnitude of a sum of the third change and the fourth change is smaller than magnitude of the third change.

19. The apparatus according to claim 18, wherein within the target range, among a thermal expansion coefficient of the second hardware element, a gradient of the first dimension with respect to the second dimension, a gradient of the first property with respect to the first dimension, and a gradient of the first property with respect to the temperature:

any one of the four is positive and the other three are negative; or any one of the four is negative and the other three are positive.

* * * * *